(12) United States Patent
Yamasaki et al.

(10) Patent No.: US 9,073,293 B2
(45) Date of Patent: Jul. 7, 2015

(54) RESIN COMPOSITION, METHOD FOR PRODUCTION THEREOF AND MULTILAYERED STRUCTURE

(75) Inventors: Yoshikazu Yamasaki, Okayama (JP); Yasuhiro Nonaka, Okayama (JP); Kazuyuki Somemiya, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 21 days.

(21) Appl. No.: 13/637,287

(22) PCT Filed: Mar. 23, 2011

(86) PCT No.: PCT/JP2011/057020
§ 371 (c)(1),
(2), (4) Date: Sep. 25, 2012

(87) PCT Pub. No.: WO2011/118648
PCT Pub. Date: Sep. 29, 2011

(65) Prior Publication Data
US 2013/0018133 A1    Jan. 17, 2013

(30) Foreign Application Priority Data
Mar. 25, 2010  (JP) ................................. 2010-071003

(51) Int. Cl.
*C08L 29/06*   (2006.01)
*B32B 27/30*   (2006.01)
*C08K 5/09*    (2006.01)
*C08K 5/092*   (2006.01)
*C08K 5/098*   (2006.01)

(52) U.S. Cl.
CPC ............. *B32B 27/306* (2013.01); *C08K 5/09* (2013.01); *C08K 5/092* (2013.01); *C08K 5/098* (2013.01)

(58) Field of Classification Search
CPC .......... C08K 5/098; C08K 5/092; C08K 5/09; B32B 27/306
USPC ......................................................... 524/140
See application file for complete search history.

(56) References Cited

U.S. PATENT DOCUMENTS

| 6,242,087 B1 | 6/2001 | Kawai | |
| 6,686,405 B1 * | 2/2004 | Kawahara et al. | 524/127 |
| 2002/0028871 A1 * | 3/2002 | Kawahara et al. | 524/524 |

FOREIGN PATENT DOCUMENTS

| CN | 1299845 A | 6/2001 |
| EP | 1 036 652 A1 | 9/2000 |
| JP | 64 66262 | 3/1989 |
| JP | 5 194805 | 8/1993 |
| JP | 10 67898 | 3/1998 |
| JP | 11-35768 A | 2/1999 |
| JP | 2001 146539 | 5/2001 |
| JP | 2002 121290 | 4/2002 |
| JP | 2002 284811 | 10/2002 |
| JP | 2002 284886 | 10/2002 |
| JP | 2003 170552 | 6/2003 |
| JP | 2004 91442 | 3/2004 |
| JP | 2005 36115 | 2/2005 |
| JP | 2005 146268 | 6/2005 |
| JP | 2007 63428 | 3/2007 |
| JP | 2010-59418 A | 3/2010 |
| WO | 00 20211 | 4/2000 |

OTHER PUBLICATIONS

Extended European Search Report issued Apr. 11, 2014 in Patent Application No. 11759453.1.
International Search Report Issued Jun. 14, 2011 in PCT/JP11/57020 Filed Mar. 23, 2011.
Office Action issued Mar. 10, 2015 in Russian Patent Application No. 2012145281 (with English Translation).

* cited by examiner

*Primary Examiner* — Doris Lee
(74) *Attorney, Agent, or Firm* — Oblon, McClelland, Maier & Neustadt, L.L.P.

(57) ABSTRACT

An object of the present invention is to provide an EVOH-containing resin composition which has superior appearance characteristics and long-run workability in melt molding and enables occurrence of yellowing etc., in melt molding to be inhibited particularly, even in melt molding at high temperatures of, for example, no less than 260° C. Further provided is a multilayered structure molded from the composition. The present invention provides a resin composition containing (A) an ethylene-vinyl alcohol copolymer, (B) a carboxylic acid and/or a carboxylate ion, and (C) a metal ion, wherein the component (B) includes (B2) a multivalent carboxylic acid and/or a multivalent carboxylate ion, and the molar ratio (B2/C) of the multivalent carboxylic acid and the multivalent carboxylate ion (B2) to the metal ion (C) is 0.002 or greater and 2 or less.

21 Claims, 1 Drawing Sheet

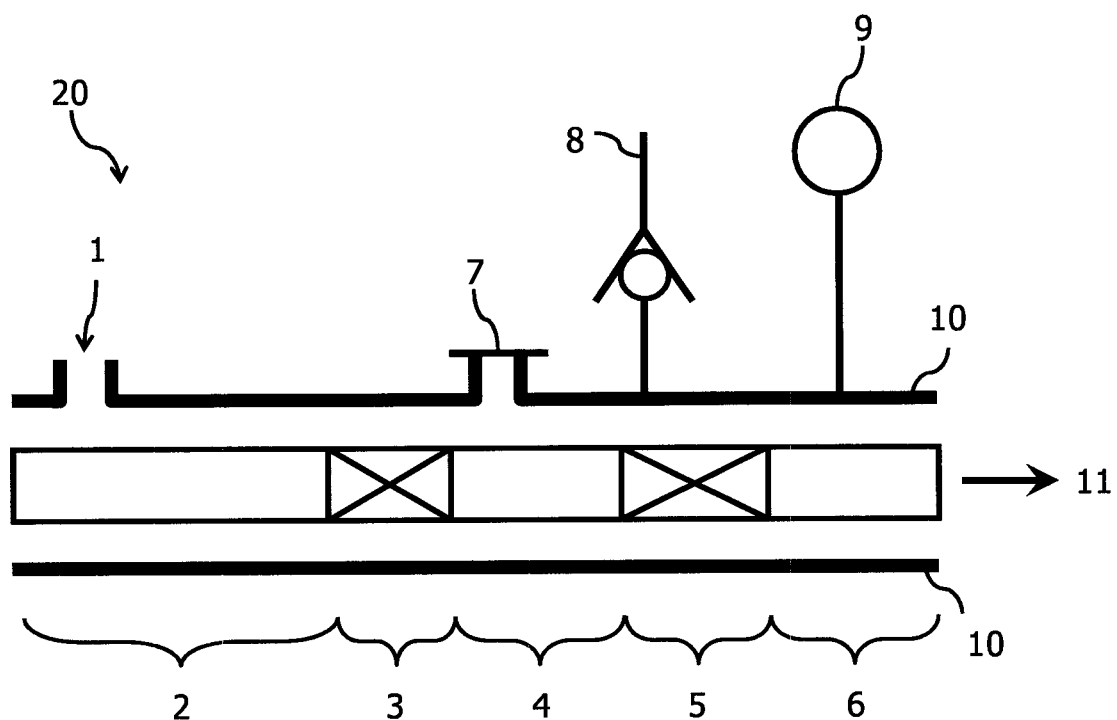

RESIN COMPOSITION, METHOD FOR PRODUCTION THEREOF AND MULTILAYERED STRUCTURE

TECHNICAL FIELD

The present invention relates to a resin composition, a method for production thereof and a multilayered structure including a layer obtained from the resin composition.

BACKGROUND ART

Ethylene-vinyl alcohol copolymers (hereinafter, may be also referred to as "EVOH") are superior in oxygen barrier properties, transparency, oil resistance, antistatic properties, mechanical strength and the like, and thus have been widely used as various types of wrapping materials such as films, sheets, containers, etc.

These materials such as films are usually formed by a melt molding method. Therefore, EVOH is expected to have superior appearance characteristics in melt molding (being enabling molded products having superior appearances without generation of gels and seeds (dirt under paint), occurrence of coloring such as yellowing, and the like to be obtained), long-run workability (a property capable of obtaining a molded product without generation of fish eyes, streaks, etc., due to no change of physical properties such as viscosity, etc., if molded for a long period of time), and the like. In addition, films, sheets and the like are often formed with a multilayered structure having an EVOH layer for the purpose of improving oxygen barrier properties and the like. When such a multilayered structure is to be obtained, a metal salt is often contained in an EVOH composition in order to improve adhesiveness between layers. However, it is known that when a metal salt is contained in an EVOH composition, coloring such as yellowing is more likely to be caused, and thus appearance characteristics are deteriorated. Particularly in an intended usage of sheet molding and the like, an edge part (trim) of a sheet after a molded product was obtained is recovered and reused, and there is a disadvantage that deterioration of the EVOH proceeds every time reuse is repeated, and defects such as gels and seeds increase whereby an appearance of a molded product is deteriorated.

Under such circumstances, so as to improve these various characteristics demanded for EVOH, particularly, appearance characteristics, various types of methods in which acids such as carboxylic acid and phosphoric acid, and metal salts such as alkali metal salts and alkaline earth metal salts are contained in an appropriate content in an EVOH composition have been proposed (see Japanese Unexamined Patent Application, Publication Nos. S64-66262 and 2001-146539). The EVOH compositions obtained by these methods reportedly enable the appearance characteristic and a long-run workability to be improved, and a molded article having a superior appearance without gels, seeds or the like to be obtained.

However, even these compositions cannot sufficiently prevent occurrence of coloring such as yellowing in melt molding. Particularly, when a multilayered structure is molded by co-extrusion with an EVOH and other thermoplastic resin, melt molding may be carried out at a comparatively high temperature over 200° C. in accordance with a melting temperature of the other resin. In the case in which melt molding is carried out at such a comparatively high temperature, conventional EVOH compositions have been disadvantageous in that yellowing, etc. is likely to occur. Furthermore, in co-extrusion of an EVOH with a thermoplastic resin such as nylon or polyester, molding thereof requires a high temperature, so that an EVOH is also exposed to a higher temperature such as e.g., no lower than 260° C. Therefore, an EVOH has been required which can prevent yellowing from occurring under such high temperatures.

PRIOR ART DOCUMENTS

Patent Documents

Patent Document 1: Japanese Unexamined Patent Application, Publication No. S64-66262
Patent Document 2: Japanese Unexamined Patent Application, Publication No. 2001-146539

SUMMARY OF THE INVENTION

Problems to be Solved by the Invention

The present invention was made in view of the circumstances described above, and an object of the present invention is to provide an EVOH-containing resin composition having superior appearance characteristics and long-run workability in melt molding and being capable of inhibiting occurrence of yellowing, etc., in melt molding, particularly in melt molding even at a high temperature of, for example, no lower than 260° C., and to provide a multilayered structure molded from the composition. A further object of the present invention is to provide a method for producing the EVOH-containing resin composition.

Means for Solving the Problems

One aspect of the present invention made to solve the foregoing problems provides a resin composition containing:
(A) an ethylene-vinyl alcohol copolymer (hereinafter, may be also referred to as "(A) component");
(B) a carboxylic acid and/or a carboxylate ion (hereinafter, may be also referred to as "(B) component"); and
(C) a metal ion (hereinafter, may be also referred to as "(C) component"),
wherein
the carboxylic acid and/or the carboxylate ion (B) includes (B2) a multivalent carboxylic acid and/or a multivalent carboxylate ion (hereinafter, may be also referred to as "(B2) component"), and
the molar ratio (B2/C) of the multivalent carboxylic acid and the multivalent carboxylate ion (B2) to the metal ion (C) is 0.002 or greater and 2 or less.

Since the resin composition of the present invention contains a multivalent carboxylic acid and/or a multivalent carboxylate ion as the component (B2) and a metal ion as the component (C), a multilayered structure superior in interlayer adhesiveness can be obtained, and further generation of gels, seeds or the like in melt molding can be inhibited, thereby resulting in an achievement of superior appearance characteristics and the long-run workability. Particularly, it is considered that since the proportion of the metal ion as the component (C), and the multivalent carboxylic acid and multivalent carboxylate ion as the component (B2) contained falls within the above-described range in the resin composition, the multivalent carboxylic acid and the like are stably coordinated with the metal ion that is reportedly a cause of yellowing, etc., thereby enabling an incorporation of the metal ion. According to the resin composition, the multivalent carboxylic acid and the like are stably present in a state of coordination with the metal ion as described above, so that a catalytic function that the metal ion has for reactions such as yellowing of the EVOH can be inhibited. As a result, coloring such as yellowing can be inhibited in melt molding not only at a usually employed temperature, for example, no lower than 200° C., but also at a higher temperature, for example, no lower than 260° C.

The content of the component (B2) is preferably 0.01 μmol/g or greater and 20 μmol/g or less. According to the resin composition, due to the content of the component (B2) falling within the range, various characteristics such as a high inhibition property against yellowing in melt molding at a high temperature are enhanced.

The component (B2) preferably has at least one type of functional group selected from the set consisting of a hydroxy group, an amino group and a ketone group. In the case in which the component (B2), i.e., the multivalent carboxylic acid and/or the multivalent carboxylate ion has such functional groups, stability in a state where the component (B2) is coordinated with the metal ion is enhanced, so that an inhibition property of occurrence of coloring in melt molding of the resin composition at a high temperature, and the like can be enhanced.

Of these functional groups, a hydroxy group is favorable in that, for example, coordination strength with the metal ion can be adjusted appropriately, and a multilayered structure superior in interlayer adhesiveness is obtained whereas occurrence of coloring is inhibited.

At least a pair of carboxyl groups in the component (B2) are preferably linked each other via a linking group having 1 or 2 carbon atom(s). It is considered that the multivalent carboxylic acid and the like can be coordinated in a sterically stable manner with respect to one metal ion since at least a pair of carboxyl groups in the multivalent carboxylic acid and/or the multivalent carboxylate ion in the component (B2) is arranged with such an interval in the structure of the component (B2). Therefore, according to the resin composition, occurrence of coloring such as yellowing in melt molding at a high temperature can be further reduced. In addition, various characteristics such as the appearance characteristic, the long-run workability, adhesiveness between layers, etc. can be achieved in a well-balanced manner. It is to be noted that a carboxyl group herein includes also a carboxylate group in a carboxylate ion.

The component (B2) preferably has at least three carboxyl groups. Since a multivalent carboxylic acid and/or a multivalent carboxylate ion having at least three carboxyl groups can be coordinated with a metal ion in a more electrically and sterically stable and efficient manner, various functions such as an inhibitory function of occurrence of coloring in melt molding of the resin composition at a high temperature can be improved.

The content of the component (C) is preferably 2.5 μmol/g or greater and 22 μmol/g or less. According to the resin composition, due to the content of the metal ion as the component (C) falling within the range, the appearance characteristics are improved, and further the interlayer adhesiveness in molding a multilayered structure and the like can be enhanced.

The component (C) preferably includes (C1) an alkali metal ion (hereinafter, may be also referred to as "(C1) component"). Due to including an alkali metal ion in the component (C), the appearance characteristics are improved, and further the long-run workability, the interlayer adhesiveness in molding a multilayered structure, and the like are enhanced.

The content of the component (C1) is preferably 2.5 μmol/g or greater and 22 μmol/g or less. In the resin composition, when the content of the alkali metal ion as the component (C1) falls within the range, the long-run workability and the interlayer adhesiveness when molded into a multilayered structure can be well balanced at a higher level.

The molar ratio (B2/C) of the component (B2) to the component (C1) is preferably 0.002 or greater and 2 or less. According to the resin composition, due to the molar ratio of the component (C1) to the component (B2) falling within the range, further higher inhibitory potential against coloring at a high temperature can be achieved whereas a balance between the long-run workability and the interlayer adhesiveness in molding a multilayered structure is maintained.

It is preferred that the component (C) also includes (C2) an alkaline earth metal ion (hereinafter, also referred to as "(C2) component"). When the component (C) in the resin composition includes an alkaline earth metal ion, the appearance characteristic is improved, and further generation of gels or seeds is inhibited even when the multilayered structure including an EVOH layer is repeatedly recovered and reused, thereby resulting in inhibition of deterioration of an appearance of a molded product.

The resin composition preferably further contains (D) a phosphate compound (hereinafter, may be also referred to as "(D) component") and the content of the phosphate compound (D) is preferably 5 ppm or greater and 500 ppm or less in a value of phosphate radical. When the resin composition contains a phosphate compound falling within the range, thermal stability in melt molding is enhanced, whereby the appearance characteristics, etc. can be further improved.

The resin composition preferably further contains (E) a boron compound (hereinafter, may be also referred to as "(E) component") and the content of the boron compound (E) is preferably 50 ppm or greater and 2,000 ppm or less in a value of boron element. Also when the resin composition contains the boron compound falling within the range, thermal stability in melt molding is enhanced, thereby enabling further improvement in the appearance characteristics, etc.

The content of (B1) a monocarboxylic acid and a monocarboxylate ion as the component (B) (hereinafter, may be also referred to as "(B1) component") is preferably less than 2 μmol/g. When the content of the monocarboxylic acid and the monocarboxylate ion as the component (B1) falls within the range, the appearance characteristics is improved, and further generation of an odor in molding and/or of a molded product can be inhibited.

The component (B) also preferably further includes the monocarboxylic acid and/or the monocarboxylate ion (B1), and the content of the monocarboxylic acid and the monocarboxylate ion (B1) is no less than 2 μmol/g. When the content of the monocarboxylic acid and the monocarboxylate ion as the component (B1) falls within the range, adjustment of quantities of the component (B) and the component (C) is facilitated in producing the resin composition, thereby enabling a stable production.

The resin composition can be suitably used in intended usage of co-extrusion molding due to having superior appearance characteristics and the long-run workability and can reduce occurrence of yellowing, etc. particularly in melt molding at high temperatures.

According to other aspect of the present invention, a method for producing the resin composition includes:

a copolymerizing step in which ethylene and a vinyl ester are copolymerized to obtain an ethylene-vinyl ester copolymer; and a saponifying step in which the ethylene-vinyl ester copolymer is saponified to obtain an ethylene-vinyl alcohol copolymer, and the method further includes a mixing step in which the ethylene-vinyl ester copolymer or the ethylene vinyl alcohol copolymer is mixed with (B2') a multivalent carboxylic acid and/or a salt thereof (hereinafter, may be also referred to as "(B2') component"), later than the copolymerizing step.

According to the method for producing the resin composition, a resin composition with inhibited occurrence of yellowing, etc. in melt molding can be obtained by carrying out mixing of the component (B2') later than the copolymerizing step.

The mixing step is preferably carried out in a system in which the concentration of the vinyl ester is no greater than 1,000 ppm. According to the method, yellowing in melt molding of the obtained resin composition is inhibited, and further favorable color characteristics of the resin composition per se can be attained.

It is preferred that the method for producing the resin composition of the present invention further includes an pelletizing step in which a water-containing pellet of an ethylene-vinyl alcohol copolymer is obtained by an pelletizing operation from a solution including the ethylene-vinyl alcohol copolymer obtained in the saponifying step, and a drying step in which the water-containing pellet is dried to obtain a resin composition including an ethylene-vinyl alcohol copolymer, wherein the mixing step is carried out later than the pelletizing step. Also according to the method, a resin composition accompanied by reduced yellowing in melt molding can be obtained effectively.

It is preferred that the mixing step is carried out between the pelletizing step and the drying step by immersing the water-containing pellet in a solution containing the component (B2'). According to the method, the component (B2') can be efficiently mixed in the resin composition, whereby a resin composition accompanied by inhibited yellowing in melt molding can be effectively produced.

It is also preferred that the mixing step is carried out in the pelletizing step. According to the method, yellowing in melt molding of the obtained resin composition is reduced, and further favorable color characteristics of the resin composition per se can be attained.

The mixing step is preferably carried out in the saponifying step. According to the method, yellowing is reduced in melt molding when the resin composition of the present invention is obtained, and further favorable color characteristics of the resin composition per se can be attained.

In another aspect of the present invention, a multilayered structure is provided with at least one layer obtained from the aforementioned resin composition. The multilayered structure of the present invention has a superior appearance with inhibited occurrence of coloring such as yellowing, gels, seeds, and the like since the multilayered structure of the present invention is provided with a layer obtained from the resin composition superior in the appearance characteristics and the long-run workability as described above.

Effects of the Invention

As described above, the resin composition of the present invention has superior appearance characteristics and the long-run workability in melt molding, and enables occurrence of yellowing etc., in melt molding to be inhibited particularly, even in melt molding at high temperatures of, for example, no less than 260° C. In addition, provided that a resin composition is produced according to the producing method of the present invention, the effects described above can be surely obtained. According to the resin composition of the present invention, various types of molded articles such as monolayered or multilayered films, sheets, pipes, containers and fibers superior in the appearance characteristics can be obtained.

BRIEF DESCRIPTION OF THE DRAWINGS

FIG. 1 shows a schematic view illustrating a biaxial extruder used in Example 57.

DESCRIPTION OF EMBODIMENTS

Hereinafter, preferred modes for carrying out the invention will be described in detail in the order of a resin composition, a producing method and a multilayered structure.

(Resin Composition)

The resin composition of the present invention contains (A) an ethylene-vinyl alcohol copolymer, (B) a carboxylic acid and/or a carboxylate ion and (C) a metal ion, and the component (B) includes (B2) a multivalent carboxylic acid and/or a multivalent carboxylate ion. The resin composition may contain (D) a phosphate compound and (E) a boron compound as suitable components, and further may contain other optional component. It is to be noted that in the resin composition, the carboxylate ion as the component (B) may form a salt with a counter cation such as the metal ion as the component (C), whereas the metal ion as the component (C) may form a salt with a counter anion such as the carboxylate ion as the component (B). Hereinafter, each component will be explained.

((A) EVOH)

(A) EVOH is a principal component of the resin composition. The EVOH (A) is a copolymer having an ethylene unit and a vinyl alcohol unit as principal structural units. It is to be noted that the EVOH may include one type or a plurality of types of other structural units except for the ethylene unit and the vinyl alcohol unit. The EVOH is typically obtained by polymerizing ethylene and a vinyl ester, and saponifying the resulting ethylene-vinyl ester copolymer.

The lower limit of the ethylene content in the EVOH (i.e., the proportion of the number of ethylene units with respect to the total number of the monomer units in the EVOH) is preferably 20 mol %, more preferably 22 mol % and further preferably 24 mol %. On the other hand, the upper limit of the ethylene content in the EVOH is preferably 60 mol %, more preferably 55 mol % and further preferably 50 mol %. When the ethylene content in the EVOH falls within the range, sufficient appearance characteristics and the long-run workability can be achieved. When the ethylene content in the EVOH is smaller than the lower limit, for example, water resistance, hot water resistance and a gas barrier property under a high humidity when molded into a multilayered structure may be impaired, or melt moldability may be deteriorated. To the contrary, when the ethylene content in the EVOH exceeds the upper limit, the gas barrier property when molded into a multilayered structure may be impaired.

The lower limit of a degree of saponification of the EVOH (i.e., a proportion of the number of vinyl alcohol units with respect to the total number of vinyl alcohol units and vinyl ester units in the EVOH) is preferably 80 mol %, more preferably 95 mol % and further preferably 99 mol %. On the other hand, the upper limit of the degree of saponification of the EVOH is preferably 100 mol % and more preferably 99.99 mol %. When the degree of saponification of the EVOH is less than the lower limit, the gas barrier property when molded into a multilayered structure may be impaired and coloring resistance may be unsatisfactory.

The lower limit of the melt flow rate of the EVOH (in accordance with JIS-K7210, a measured value at a temperature of 210° C., under a load of 2160 g) is preferably 0.1 g/10 min, more preferably 0.5 g/10 min, further preferably 1 g/10 min and particularly preferably 3 g/10 min. On the other hand, the upper limit of the melt flow rate in the EVOH is preferably 200 g/10 min, more preferably 50 g/10 min, further preferably 30 g/10 min, particularly preferably 15 g/10 min and further particularly preferably 10 g/10 min. When the melt flow rate of the EVOH falls within the range, the melt moldability of the obtained resin composition is enhanced, thereby enabling an achievement more superior appearance characteristics and long-run workability.

((B) Carboxylic Acid and/or Carboxylate Ion)

The carboxylic acid and/or the carboxylate ion contained in the resin composition is exemplified by (B1) a monocarboxylic acid and/or a monocarboxylate ion, and (B2) a multivalent carboxylic acid and/or a multivalent carboxylate ion. The resin composition includes the multivalent carboxylic acid and/or the multivalent carboxylate ion (B2) as an essential component.

((B1) Monocarboxylic Acid and/or Monocarboxylate Ion)

The monocarboxylic acid is a compound having one carboxyl group in a molecule. Whereas, the monocarboxylate ion is obtained by eliminating a proton in a carboxyl group of a monocarboxylic acid.

The content of the monocarboxylic acid and the monocarboxylate ion (B1) is, in light of reducing an odor, preferably less than 2 µmol/g, more preferably less than 1.5 µmol/g, further preferably less than 1.2 µmol/g and particularly preferably less than 1.0 µmol/g with respect to the total of the resin composition. When the content of the monocarboxylic acid falls within the range, the odor of the resin composition per se is reduced, and additionally the odor that is generated in melt molding of the resin composition is reduced, so that the operation environment is improved. In addition, the odor that the molded product has after melt molding is reduced, so that the multilayered structure produced using the resin composition can be suitably used as a packaging material for even contents such as cooked rice and drinking water having a commercial value that is likely to be impaired particularly by generation of the odor.

In addition, the content of the monocarboxylic acid and the monocarboxylate ion (B1) is preferably no less than 2 µmol/g with respect to the total of the resin composition in light of quality stability, etc. In this case, the content of the component (B1) is preferably no less than 2.5 µmol/g and more preferably no less than 3 µmol/g. The resin composition having the content of the monocarboxylic acid and the monocarboxylate ion falling within the range enables the quantities of the component (B2) and the component (C) to be easily adjusted in producing the resin composition and products having stable quality to be easily obtained.

The monocarboxylic acid is not particularly limited, and examples thereof include formic acid, acetic acid, propionic acid, lactic acid, caproic acid, capric acid, acrylic acid, methacrylic acid, benzoic acid, 2-naphthoic acid, and the like. These monocarboxylic acids may have a hydroxyl group or a halogen atom. In addition, the monocarboxylate ion is exemplified by an ion obtained by eliminating a proton in a carboxyl group in each of the monocarboxylic acids.

The pKa of the monocarboxylic acid (including also the monocarboxylic acid that gives the monocarboxylate ion) is preferably no less than 3.5 and more preferably no less than 4 in light of an ability of adjusting the pH of the composition and melt moldability. Examples of the monocarboxylic acid include formic acid (pKa=3.68), acetic acid (pKa=4.74), propionic acid (pKa=4.85), lactic acid (pKa=4.80), and the like, and acetic acid is preferable in light of easiness in handling, etc.

((B2) Multivalent Carboxylic Acid and/or Multivalent Carboxylate Ion)

The multivalent carboxylic acid contained in the resin composition of the present invention is a compound having at least two carboxyl groups per molecule. It is to be noted that polymers are not included in the multivalent carboxylic acid. In addition, the multivalent carboxylate ion is obtained by eliminating at least one of protons in carboxyl groups in a multivalent carboxylate acid. Due to containing the component (B2), the pH in the composition can be controlled and generation of gels and seeds in melt molding is reduced, and further occurrence of coloring such as yellowing resulting from a metal ion in melt molding can be reduced.

In the resin composition, it is uncertain as to why the occurrence of coloring such as yellowing can be inhibited due to including the multivalent carboxylic acid and/or the multivalent carboxylate ion as the component (B2) together with metal ion as the component (C) described later; however, it is believed that the inhibition may result from, for example, stable coordination of the multivalent carboxylic acid and the like with the metal ion that is reportedly a cause of yellowing, etc., thereby enabling incorporation of the metal ion. It is considered that the multivalent carboxylic acid and the like are present stably in the state of coordination with the metal ion in such a manner, whereby a catalytic function of the metal ion for a reaction such as yellowing of the EVOH can be inhibited, and as a result, occurrence of coloring such as yellowing also in melt molding at high temperatures can be inhibited. It is to be noted that the metal ion and the multivalent carboxylic acid, etc. are bonded by a comparatively weak interaction, so that only a small influence can be made on the interlayer adhesiveness in forming a multilayered structure; therefore, the resin composition of the present invention can achieve superior interlayer adhesiveness also in forming a multilayered structure.

The lower limit of the molar ratio (B2/C) of the content of the multivalent carboxylic acid and the multivalent carboxylate ion as the component (B2) (content in a dry resin composition) to the content of the component (C) is defined as 0.002, preferably 0.005, more preferably 0.01, further preferably 0.1 and particularly preferably 0.2. On the other hand, the upper limit of the molar ratio is defined as 2, preferably 1.4, more preferably 1 and further preferably 0.6.

In the resin composition, when the ratio of content of the multivalent carboxylic acid and the multivalent carboxylate ion as the component (B2) to the content of the metal ion as the component (C) falls within the range, it is believed that the multivalent carboxylic acid can be sufficiently and stably coordinated with the metal ion, whereby coloring can be inhibited. The molar ratio of less than the lower limit leads to failure in sufficient inhibition of the occurrence of yellowing, etc. by an influence of the metal ion, due to the small amount of the coordinated multivalent carboxylic acid. To the contrary, when the molar ratio exceeds the upper limit, gels and seeds are likely to be generated due to the presence of a free multivalent carboxylic acid that cannot be coordinated with the metal ion, whereby the long-run workability and the appearance characteristics are deteriorated, and further there is a disadvantage that the coloring is rather enhanced.

When the resin composition include (C1) an alkali metal ion described later in detail that is suitable as the component (C), the lower limit of the molar ratio (B2/C1) of the component (B2) to the component (C1) is preferably 0.002, more preferably 0.005, still more preferably 0.01, further preferably 0.1 and particularly preferably 0.2. On the other hand, the upper limit of the molar ratio is preferably 2, more preferably 1.4, more preferably 1 and further preferably 0.6. When the molar ratio of the component (B2) to the component (C1) falls within the range, a higher inhibitory potential of coloring at high temperatures can be attained whereas the balance of the long-run workability and the interlayer adhesiveness in molding the multilayered structure is maintained.

The lower limit of the specific content of the multivalent carboxylic acid and the multivalent carboxylate ion as the component (B2) is preferably 0.01 µmol/g, more preferably 0.05 µmol/g, further preferably 0.1 µmol/g and particularly preferably 0.5 µmol/g. On the other hand, the upper limit of the content is preferably 20 µmol/g, more preferably 15 µmol/g, further preferably 10 µmol/g and particularly preferably 6 µmol/g. When the content of the multivalent carboxylic acid and the like as the component (B2) is less than the lower limit, an inhibitory effect of coloring such as yellowing may be small. To the contrary when the content exceeds the upper limit, the appearance characteristics may be impaired (e.g., gels and seeds are likely to be generated) and the long-run workability may be deteriorated (e.g., viscosity is increased by heating for a long time of period).

The multivalent carboxylic acid as the component (B2) is not particularly limited as long as it has at least two carboxyl groups per molecule and examples thereof include aliphatic dicarboxylic acids such as oxalic acid, malonic acid, succinic acid, maleic acid, fumaric acid, malic acid, glutaric acid, adipic acid and pimelic acid, aromatic dicarboxylic acids such as phthalic acid, isophthalic acid and terephthalic acid, tricarboxylic acids such as citric acid, isocitric acid and aconitic acid, carboxylic acids having at least four carboxyl groups such as 1,2,3,4-butanetetracarboxylic acid and ethylenediaminetetraacetic acid, hydroxycarboxylic acids such as citric acid, isocitric acid, tartaric acid, malic acid, mucic acid, tartronic acid and citramalic acid, ketocarboxylic acids such as oxaloacetic acid, mesoxalic acid, 2-ketoglutaric acid and 3-ketoglutaric acid, amino acids such as glutamic acid, aspartic acid and 2-aminoadipic acid, and the like. It is to be noted that the multivalent carboxylate ion as the component (B2) is exemplified by anions of these multivalent carboxylic acids.

The component (B2) is preferably a multivalent carboxylic acid and an anion thereof having at least one functional group selected from the set consisting of a hydroxy group, an amino group and a ketone group. In the case in which such a functional group is included, stability in the state of coordination with the metal ion is enhanced, so that an ability of inhibiting occurrence of coloring in melt molding at a high temperature is enhanced. Of these functional groups, a hydroxy group is more preferably included in light of appropriate adjustment of a coordination strength with the metal ion, whereby a multilayered structure superior in interlayer adhesiveness is obtained while inhibiting the occurrence of coloring.

In the case where the multivalent carboxylic acid and the multivalent carboxylate ion as the component (B2) have a hydroxy group, the hydroxy group is preferably situated at an α-position with respect to the carboxyl group. Such a multivalent carboxylic acid and multivalent carboxylate ion have a structure in which an elimination reaction of a water molecule is easily caused by an appropriate heating. Such a multivalent carboxylic acid and the like are coordinated in the vicinity of the metal ion, whereas a coordinate binding force thereof can be weakened by an elimination reaction during heating in melt molding, and thus an ability of enhancing the interlayer adhesiveness by the alkali metal ion can be sufficiently achieved. Therefore, such a multivalent carboxylic acid and the like can maintain superior interlayer adhesiveness whereas occurrence of coloring resulting from the metal ion is reduced. Examples of the multivalent carboxylic acid and the multivalent carboxylate ion include citric acid, isocitric acid, malic acid and the like, and anions thereof.

In addition, the component (B2) is preferably a multivalent carboxylic acid in which at least a pair of carboxyl groups are linked each other via a linking group having 1 or 2 carbon atoms and an anion thereof. In such a multivalent carboxylic acid and multivalent carboxylate ion, one or a plurality of carboxyl groups can be coordinated with one metal ion in a highly sterically stable manner; therefore, a coordination state is considered to be stable as a complex. Thus, coloring such as yellowing, etc. can be effectively suppressed, and other various functions can be also achieved with a good balance. It is to be noted that the linking group having 1 or 2 carbon atoms may include aliphatic linking groups such as an alkanediyl group, an alkanetriyl group and an alkenetriyl group, or aromatic linking groups such as a 1,2-benzenediyl group. Examples of such a type of multivalent carboxylic acid and multivalent carboxylate ion include citric acid, isocitric acid, malic acid, tartaric acid, malonic acid, succinic acid, itaconic acid, maleic acid, fumaric acid, tartronic acid, citramalic acid, aconitic acid, aspartic acid, 1,2,3,4-butanetetracarboxylic acid and the like, and anions thereof.

Furthermore, the component (B2) is preferably a multivalent carboxylic acid having at least three carboxyl groups like citric acid, isocitric acid, 1,2,3,4-butanetetracarboxylic acid, ethylene diamine tetraacetic acid and the like, and anions thereof. It is considered that due to using such a multivalent carboxylic acid and multivalent carboxylate ion, a coordination state with the alkali metal ion has electrically and sterically superior stability. As a result, superior coloring reducing function is suggested to be achieved.

((C) Metal Ion)

The metal ion as the component (C) may involve a single type of metal or a plurality of types of metal. Due to including the metal ion in the resin composition of the present invention, interlayer adhesiveness can be enhanced in molding a multilayered structure, and as a result, durability of the multilayered structure can be enhanced. Although the reason why the metal ion enhances the interlayer adhesiveness is not necessarily clear, it is considered that affinity between hydroxy groups with one another in the EVOH is made higher between layers by the presence of the metal ions. In addition, in the case in which one of adjacent layers has a functional group capable of reacting with a hydroxy group in the EVOH in a molecule, it is also considered that the bond generation reaction is accelerated by the presence of the metal ion, etc. The metal ion as the component (C) is exemplified by the alkali metal ion (C1), the alkaline earth metal ion (C2), and other transition metal ion, and the like.

The lower limit of the content of the metal ion (content in a dry resin composition) is preferably 2.5 µmol/g, more preferably 3.5 µmol/g and further preferably 4.5 µmol/g. On the other hand, the upper limit of the content is preferably 22 µmol/g, more preferably 16 µmol/g and further preferably 10 µmol/g. When the content of the metal ion is less than the lower limit, the interlayer adhesiveness is decreased, whereby durability when molded into a multilayered structure may be decreased. To the contrary, when the content of the metal ions exceeds the upper limit, occurrence of coloring in the resin composition is less likely to be reduced, whereby the appearance characteristics may be deteriorated.

The metal ion as the component (C) preferably includes the alkali metal ion (C1). Examples of the alkali metal ion include ions such as lithium, sodium, potassium, rubidium and cesium, and the ion of sodium or potassium is more preferable in light of industrial availability. When the component (C) includes the alkali metal ion, the long-run workability and interlayer adhesive strength in forming a multilayered structure are enhanced.

The alkali metal salt that gives the alkali metal ion as the component (C1) is not particularly limited, and is exemplified by aliphatic carboxylate salts, aromatic carboxylate salts, phosphate salts, and metal complexes, and the like, of such as lithium, sodium and potassium. The alkali metal salt is, specifically, exemplified by sodium acetate, potassium acetate, sodium phosphate, lithium phosphorate, sodium stearate, potassium stearate, sodium salts of ethylenediaminetetraacetic acid, and the like. Of these, sodium acetate, potassium acetate and sodium phosphate are particularly preferable in light of availability.

The lower limit of the content of the alkali metal ion (C1) (content in a dry resin composition) is preferably 2.5 μmol/g, more preferably 3.5 μmol/g and further preferably 4.5 μmol/g. On the other hand, the upper limit of the content is preferably 22 μmol/g, more preferably 16 μmol/g and further 10 μmol/g. When the content of the alkali metal ion is less than the lower limit, the interlayer adhesiveness is decreased, whereby durability when molded into a multilayered structure may be decreased. To the contrary, when the content of the alkali metal ions exceeds the upper limit, occurrence of coloring in the resin composition is less likely to be reduced, whereby the appearance characteristics may be deteriorated.

It is also preferred that the component (C) includes the alkaline earth metal ion (C2). Examples of the alkaline earth metal ion (C2) include ions of beryllium, magnesium, calcium, strontium, barium and the like, and ions of magnesium or calcium are more preferable in light of industrial availability. When the component (C) includes the alkaline earth metal ion (C2), deterioration of the EVOH in repeated reuse of a multilayered structure is inhibited, and an appearance of a molded product is enhanced by a decrease of defects such as gels and seeds.

((D) Phosphate Compound)

When the phosphate compound as the component (D) is contained in the resin composition of the present invention, thermal stability of the resin composition in melt molding can be enhanced. As a result, generation of gels and seeds is inhibited, thereby enabling improvement of the appearance characteristics.

The phosphate compound is not particularly limited and is exemplified by various types of oxo acids of phosphorus such as phosphoric acid and phosphorous acid, and salts thereof, and the like. The phosphate salts may be contained in any forms such as a phosphate salt, a monohydrogen phosphate salt or a dihydrogen phosphate salt, and the type of counter cation thereof is not particularly limited, which is preferably an alkali metal or an alkaline earth metal and more preferably an alkali metal. Specifically, sodium dihydrogen phosphate, potassium dihydrogen phosphate, disodium hydrogen phosphate or dipotassium hydrogen phosphate is preferable in light of a large thermal stability improving effect.

The lower limit of the content of the phosphate compound (content in a value of phosphate radical in a dry resin composition) is preferably 5 ppm and further preferably 8 ppm. On the other hand, the upper limit of the content of the phosphate compound is preferably 500 ppm, more preferably 200 ppm and further preferably 50 ppm. When the content of the phosphate compound is less than the lower limit, the thermal stability improving effect may not be sufficiently achieved. To the contrary, when the content of the phosphate compound exceeds the upper limit, gels and seeds may be likely to be generated in a molded product.

((E) Boron Compound)

When the boron compound as the component (E) is contained in the resin composition of the present invention, thermal stability of the resin composition in melt molding can be enhanced. As a result, generation of gels and seeds is inhibited, thereby enabling improvement of the appearance characteristics. Specifically, when the boron compound is blended with the resin composition, it is believed that a chelate compound is generated between the EVOH and the boron compound, and use of such a resin composition enables improvement of thermal stability and a mechanical properties compared with typical resin compositions.

The boron compound is not particularly limited and is exemplified by boric acids, boric acid esters, borate salts, boron hydrates, and the like. Specifically, the boric acids are exemplified by orthoboric acid ($H_3BO_3$), metaboric acid, tetraboric acid and the like; the boric acid esters are exemplified by triethyl borate, trimethyl borate and the like; and the borate salts are exemplified by alkali metal salts, alkaline earth metal salts of the foregoing various types of boric acids, borax, and the like. Of these, orthoboric acid is preferable.

The lower limit of the content of the boron compound (content of boron compound in a value of boron element in a dry resin composition) is preferably 5 ppm, more preferably 10 ppm and further preferably 50 ppm. On the other hand, the upper limit of the content of the boron compound is preferably 2,000 ppm, more preferably 1,000 ppm, further preferably 500 ppm and particularly preferably 300 ppm. When the content of the boron compound is less than the lower limit, an improving effect of thermal stability by adding the boron compound may not be obtained. To the contrary, when the content of the boron compound exceeds the upper limit, gelation is likely to occur, leading to poor molding, and the appearance characteristics may be deteriorated.

(Other Additives, etc.)

To the resin composition of the present invention, a plasticizer, a stabilizer, a surfactant, a pigment, an ultraviolet ray absorbing agent, a slip agent, an antistatic agent, a drying agent, a crosslinking agent, a filler, a reinforcing agent such as various types of fibers can be also added in appropriate amounts, within the range not to impair the effects of the present invention.

In addition, a thermoplastic resin other than the EVOH can be also blended in appropriate amounts, within the range not to impair the effects of the present invention. As the thermoplastic resin, any of various types of polyolefins (polyethylene, polypropylene, poly 1-butene, poly 4-methyl-1-pentene, an ethylene-propylene copolymer, a copolymer of ethylene and α-olefin having 4 or more carbon atoms, a copolymer of polyolefin and maleic anhydride, an ethylene-vinyl ester copolymer, an ethylene-acrylic acid ester copolymer, or a modified polyolefin obtained by graft modification of these with an unsaturated carboxylic acid or a derivative thereof, and the like), various types of nylons (nylon-6, nylon-66, nylon-6/66 copolymers, and the like), polyvinyl chloride, polyvinylidene chloride, polyester, polystyrene, polyacrylonitrile, polyurethane, polyacetal and a modified polyvinyl alcohol resin, and the like may be used. When the thermoplastic resin other than the EVOH is blended, the amount is preferably no greater than 50% by mass and more preferably no greater than 10% by mass.

(Resin Composition)

The lower limit of the melt flow rate (a value measured at a temperature of 210° C., under a load of 2,160 g) of the resin composition of the present invention is preferably 0.1 g/10 min, further preferably 0.5 g/10 min, particularly preferably 1 g/10 min and further particularly preferably 3 g/10 min. On the other hand, the upper limit of the melt flow rate of the resin composition is preferably 200 g/10 min, more preferably 50 g/10 min, further preferably 30 g/10 min, particularly preferably 15 g/10 min and further particularly preferably 10 g/10 min. When the value of the melt flow rate of the resin composition falls within the range, melt moldability is enhanced, whereby more superior appearance characteristics and the long-run workability can be achieved.

The resin composition of the present invention is molded into various types of molded articles such as films, sheets, containers, pipes and fibers by melt molding. These molded products can be also ground and molded again for the purpose of reuse. In addition, a film, a sheet, a fiber, and the like can be subjected to monoaxial orientation or biaxial orientation. As a melt molding process, extrusion molding, inflation extrusion, blow molding, melt spinning, injection molding, and the like can be employed.

The melt temperature in melt molding carried out using the resin composition of the present invention is preferably about 150 to 300° C. Particularly, in the resin composition of the present invention, the proportion of the alkali metal ions (C), and the multivalent carboxylic acid and multivalent carboxylate ion (B2) is adjusted as described above, so that occurrence of coloring such as yellowing can be inhibited not only in melt molding at a high temperature of no less than 200° C., but also in melt molding at a higher temperature of, for example, no less than 260° C.

(Method for Producing a Resin Composition)

The resin composition of the present invention can be effectively obtained by a producing method including, for example, a copolymerizing step in which ethylene and a vinyl ester are copolymerized to obtain an ethylene-vinyl ester copolymer (step 1), and a saponifying step in which the ethylene-vinyl ester copolymer is saponified to obtain an ethylene-vinyl alcohol copolymer (step 2), and further including a mixing step in which the ethylene-vinyl ester copolymer or the ethylene vinyl alcohol copolymer is mixed with (B2') a multivalent carboxylic acid and/or a salt thereof (step α), later than the copolymerizing step.

According to the method for producing the resin composition, mixing the component (B2') is carried out later than the copolymerizing step, so that a resin composition in which occurrence of yellowing, etc. in melt molding is inhibited can be obtained. Hereinafter, each step will be explained in detail.

(Step 1)

The copolymerizing step includes copolymerization of ethylene and a vinyl ester, and subsequently a procedure in which unreacted ethylene and unreacted vinyl ester are removed to obtain an ethylene-vinyl ester copolymer solution as needed. When the component (B2') is added in the copolymerizing step, the resin composition finally obtained is not preferable in that an effect to inhibit coloring such as yellowing, i.e., an effect predominantly intended by the present invention, is hardly achieved, or coloring may be rather enhanced.

A copolymerization process of ethylene with the vinyl ester is not particularly limited, and well-known methods such as, for example, solution polymerization, suspension polymerization, emulsion polymerization and bulk polymerization may be employed. Also, any of a continuous system and a batchwise system may be employed.

Examples of the vinyl ester used in polymerization include vinyl formate, vinyl acetate, vinylpropionate, vinylvalerate, vinyl caprate, vinyl laurate, vinyl stearate, vinyl benzoate, vinyl pivalate and vinyl versatate, and vinyl acetate is suitably used in light of industrial availability and/or use of the same.

In the polymerization described above, in addition to the aforementioned components, a copolymerizable monomer as a copolymerization component, for example, alkene; an unsaturated acid such as acrylic acid, methacrylic acid, crotonic acid, maleic acid or itaconic acid, or an anhydride, a salt, a mono- or dialkyl ester thereof, or the like; nitrile such as acrylonitrile or methacrylonitrile; amide such as acrylamide or methacrylamide; olefin sulfonic acid such as vinylsulfonic acid, allylsulfonic acid or metaallylsulfonic acid, or a salt thereof; an alkylvinyl ether, vinyl ketone, N-vinylpyrrolidone, vinyl chloride, vinylidene chloride or the like may be also copolymerized in a small amount.

In addition, a vinylsilane compound may be included in an amount of 0.0002 mol % or greater and 0.2 mol % or less as a copolymerization component. Herein, the vinylsilane compound may include, for example, vinyltrimethoxysilane, vinyltriethoxysilane, vinyltri(β-methoxy-ethoxy)silane, γ-methacryloyloxypropylmethoxysilane or the like. Of these, vinyltrimethoxysilane, or vinyltriethoxysilane is suitably used.

The solvent used for polymerization is not particularly limited as long as it is an organic solvent capable of dissolving ethylene, a vinyl ester and the ethylene-vinyl ester copolymer. As such a solvent, for example, an alcohol such as methanol, ethanol, propanol, n-butanol or tert-butanol; dimethyl sulfoxide or the like may be used. Of these, methanol is particularly preferable in light of ease in removal and separation after the reaction.

As the catalyst used for polymerization, for example, an azonitrile-derived initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropylpropionitrile); and organic peroxide-derived initiators such as isobutyryl peroxide, cumyl peroxyneodecanoate, diisopropyl peroxydicarbonate, di-n-propyl peroxydicarbonate, t-butyl peroxyneodecanoate, acetyl peroxide, lauroyl peroxide, benzoyl peroxide, t-butyl hydroperoxide, or the like may be used.

The polymerization temperature is preferably 20 to 90° C. and more preferably 40 to 70° C. The polymerization time is preferably 2 to 15 hrs and more preferably 3 to 11 hrs. The polymerization conversion is preferably 10 to 90% and more preferably 30 to 80% with respect to the vinyl ester charged. The content of the resin in the solution after the polymerization is preferably 5 to 85% by mass and more preferably 20 to 70% by mass.

After the polymerization for a predetermined time of period or after reaching a predetermined polymerization conversion, a polymerization inhibitor is added as needed, and unreacted ethylene gas is removed by evaporation, followed by removing an unreacted vinyl ester. As a process of removing an unreacted vinyl ester, for example, a process including continuously supplying the copolymer solution at a constant rate through an upper part of a tower filled with Raschig ring, blowing therein an organic solvent vapor such as methanol through a lower part of the tower, distilling off mixed vapor of the organic solvent such as methanol and unreacted vinyl ester through the top of the tower, and taking out the copolymer solution from which the unreacted vinyl ester was removed through the bottom of the tower, or the like may be employed.

(Step 2)

Next, an alkali catalyst is added to the copolymer solution, and the copolymer is saponified. A saponification process may be either continuous system, or a batchwise system. As the alkali catalyst, for example, sodium hydroxide, potassium hydroxide, alkali metal alcoholate, or the like may be used.

Conditions of saponification may include, for example, in the case of batchwise system: the concentration of the copolymer solution being to 50% by mass; the reaction temperature being 30 to 60° C.; the amount of the catalyst used being 0.02 to 0.6 mol per mol of the vinyl ester structural unit; and the saponification time being 1 to 6 hrs. In the case of the continuous system, a process in which the saponification reaction is carried out while efficiently removing a carboxylic acid methyl ester, and the like generated along with the saponification reaction using a conventionally well-known tower type reactor is preferable in that the amount of the alkali catalyst used can be reduced, whereas the reaction temperature is preferably 70 to 150° C. and the amount of the catalyst used is preferably 0.001 to 0.2 mol per mol of vinyl ester structural unit in order to carry out the reaction in the state of a homogenous solution.

Since the EVOH yielded after completing the saponification reaction contains the alkali catalyst, byproduct salts such as sodium acetate and potassium acetate, and other impurities, these are preferably removed by neutralizing and washing as needed. Here, when the EVOH after completing the saponification reaction is washed with water that scarcely contains metal ion, chloride ion and the like such as ion exchanged water, sodium acetate, potassium acetate and the like may partly remain.

(Step α (1))

Later than the copolymerizing step, as the mixing step, the ethylene-vinyl ester copolymer obtained in the copolymerizing step or the ethylene vinyl alcohol copolymer obtained in the saponifying step is mixed with the multivalent carboxylic acid and/or a salt thereof (B2').

The multivalent carboxylic acid as the component (B2') is exemplified by the multivalent carboxylic acid exemplified above as the component (B2) of the resin composition. In addition, a salt of the multivalent carboxylic acid as the component (B2') is exemplified by an alkali metal salt, an alkaline earth metal salt and the like of the multivalent carboxylic acid.

For the mixing, a method such as, for example, (1) a method of adding the component (B2') beforehand to a solution containing an ethylene-vinyl ester copolymer to be subjected to the saponifying step, (2) a method of adding the component (B2') during the saponification reaction of the ethylene-vinyl ester copolymer in the saponifying step, (3) a method of mixing with the component (B2') after obtaining the ethylene-vinyl alcohol copolymer in the saponifying step, or the like may be employed.

According to the method for producing the resin composition of the present invention, the mixing step is carried out later than the copolymerizing step as described above, and the mixing step is more preferably carried out in a system in which the concentration of the vinyl ester is no greater than 1,000 ppm. When the component (B2') is added to a system in which the concentration of the vinyl ester is greater than 1,000 ppm, an inhibitory effect of coloring such as yellowing is hardly achieved in the final resin composition, or coloring may be rather enhanced.

In the method for producing the resin composition of the present invention, the mixing step is preferably carried out in the saponifying step described above. Here, carrying out the mixing step in the saponifying step is exemplified by methods such as (1) a method of adding the component (B2') beforehand to the ethylene-vinyl ester copolymer subjected to the saponifying step, (2) a method of adding the component (B2') during the saponification reaction of the ethylene-vinyl ester copolymer in the saponifying step, and the like. When the mixing step is carried out in the saponifying step, heat deterioration and the like that the EVOH may be subjected to during the producing step after the saponifying step are inhibited, whereby color characteristics is improved in forming a resin composition.

In the case in which the mixing step is carried out in the saponifying step, the saponification reaction of the ethylene-vinyl ester copolymer is typically carried out in a state where the ethylene-vinyl ester copolymer is dissolved in a solvent, so that the component (B') is preferably added in the form of a multivalent carboxylic acid dissolvable into the same solvent.

In addition, after the saponification reaction is carried out in the saponifying step as described above, neutralization of remaining alkali catalyst is often executed, and the component (B2') can be also used as an acid used for the neutralization.

It is preferred that the method for producing the resin composition of the present invention, in addition to the foregoing each step, further includes an pelletizing step in which a water-containing pellet of the ethylene-vinyl alcohol copolymer is obtained by an pelletizing operation from a solution including the ethylene-vinyl alcohol copolymer obtained in the saponifying step (step 3), and a drying step in which the water-containing pellet is dried to obtain a resin composition including the ethylene-vinyl alcohol copolymer (step 4), and the mixing step is carried out after the pelletizing step. Also according to the method, a resin composition with a reduced yellowing in melt molding can be efficiently obtained.

(Step 3)

In producing the EVOH, the ethylene-vinyl alcohol copolymer obtained by saponifying the ethylene-vinyl ester copolymer by the saponifying step is typically obtained in the form of a solution in which the copolymer is dissolved in a solvent including the solvent used in the saponification reaction. In the solution, a catalyst such as alkali used for the saponification reaction and sodium acetate that is generated as a byproduct, and the like are included, so that washing is carried out in order to remove them. In order to facilitate the washing operation, it is preferable that the ethylene-vinyl alcohol copolymer solution obtained in the saponifying step is pelletized to form a water-containing pellet of the EVOH.

The operation of the pelletizing for obtaining the water-containing pellet of the EVOH from the solution of the ethylene-vinyl alcohol copolymer in the pelletizing step is not particularly limited, and well-known methods may be used such as a method in which a cylindrical water-containing pellet of the EVOH is obtained by extruding the solution of the ethylene-vinyl alcohol copolymer into a coagulating bath including a cooled poor solvent to give a strand form followed by cooling and hardening and thereafter cutting using a strand cutter, or a method in which an ellipsoidal (go-stone-like) to spherical water-containing pellet of the EVOH is obtained by similarly extruding the solution of the ethylene-vinyl alcohol copolymer into a coagulating bath, immediately followed by cutting using a rotating blade, etc. Alternatively, a method in which a water-containing pellet of the EVOH is obtained by bringing the solution of the ethylene-vinyl alcohol copolymer into contact with water vapor to previously give a water-containing resin composition of the EVOH followed by cutting, according to a method described in Japanese Unexamined Patent Application, Publication No. 2002-121290, or the like can be suitably used.

The moisture content in the water-containing pellet of the EVOH obtained by these methods is preferably 50 to 200% by mass, more preferably 60 to 180% by mass and further preferably 70 to 150% by mass on the basis of the dry weight of the EVOH.

(Step 4)

The water-containing pellet of the EVOH obtained in the pelletizing step is preferably formed into a pellet of the resin composition including the EVOH finally by drying in the drying step. The moisture content of the resin composition pellet after drying is preferably no greater than 1.0% by mass, more preferably no greater than 0.8% by mass and further preferably no greater than 0.5% by mass with respect to the total of the resin composition pellet for the purpose of preventing molding troubles such as generation of a void by foaming in a molding processing.

The method of drying the water-containing pellet of the EVOH is not particularly limited and well-known various types of methods can be used, and suitable examples of the methods include ventilation drying, fluidized drying and the like. These drying methods may be used either alone, or in combination of a plurality of the same, such as e.g., fluidized drying followed by ventilation drying. Drying treatment may be carried out by any method with a continuous system or a batchwise system. When a plurality of drying methods are carried out in combination, the continuous system or the batchwise system can be selected ad libitum for each drying method. Drying at a low oxygen concentration or in an oxygen-free state is also preferable in that deterioration of the resin composition by oxygen during drying can be reduced.

(Step α (2))

As a method of carrying out the mixing step after the pelletizing step, a method such as (1) a method of bringing the water-containing pellet of the EVOH into contact with a solution containing the component (B2'), or (2) a method of melting and kneading the water-containing pellet of the EVOH and the component (B2') in an extruder is suitably employed. It is to be noted that in such a case, the component (B1), the component (C) and other components (the component (D), the component (E), etc.) can be simultaneously mixed with the EVOH.

As a method of carrying out the mixing step after the pelletizing step, a method of immersing the water-containing pellet in a solution containing the component (B2') after the pelletizing step and before the drying step is preferable. According to the method, the component (B2') can be efficiently mixed in the resin composition and a resin composition with reduced yellowing in melt molding can be more effectively produced.

In the case in which the water-containing pellet of the EVOH is immersed in a solution including the component (B2') and other components as needed, the water-containing pellet used may have an arbitrary shape such as powder, granular, spherical or cylindrical chip-shaped. Also, for the operation, any of methods by a batchwise system and a continuous system can be used. In the case in which the operation is carried out by the batchwise system, the mass ratio (bath ratio) of the EVOH in the water-containing pellet to a solution containing each component is preferably no less than 3, more preferably no less than 10 and further preferably no less than 20. In the case in which the operation is carried out by the continuous system, any of conventionally well-known tower type apparatuses can be suitably used. Although the suitable range of immersion time varies depending on the form of the water-containing pellet, in the case in which the EVOH has a particulate shape with a mean diameter of about 1 to 10 mm, the immersion time is no less than 1 hour and preferably no less than 2 hrs.

With respect to an immersion treatment in a solution, each component to be contained in the resin composition may be immersed separately in a plurality of solutions in which each component is dissolved alone, or the immersion treatment may be carried out at once using a liquid in which a plurality of components are dissolved, and the immersion treatment is preferably carried out with a solution including all the components other than the EVOH in light of simplification of steps.

When the solution containing each component other than the EVOH is obtained, the each component may be each independently dissolved in a solvent, but also a solution in which some components each other form a salt can be used. The concentration of each component in the solution is not particularly limited, and may be appropriately adjusted so that the intended content of each component is obtained in the finally obtained resin composition. The solvent of the solution is not particularly limited, and water is preferable for a handling reason, etc.

In addition, when the water-containing pellet of the EVOH and the component (B2') are melted and kneaded in an extruder in the mixing step, for example, a method described in Japanese Unexamined Patent Application, Publication No. 2002-284811, etc., may be suitably employed.

In the method for producing the resin composition of the present invention, it is also preferred that the mixing step be carried out in the pelletizing step described above. Thus mixing the component (B2') with the EVOH in the pelletizing step, enables the component (B2') to be homogeneously contained in the water-containing pellet of the EVOH. Accordingly, in the case in which the component (B2') is contained in the EVOH by immersing the water-containing pellet of the EVOH in a solution including the component (B2') later than the pelletizing step, there is an advantage that the immersion time can be shortened, and further color characteristics is improved in forming a resin composition.

(Multilayered Structure)

The multilayered structure of the present invention is a multilayered structure provided with at least one layer obtained from the resin composition of the present invention. The layer structure of the multilayered structure is not particularly limited; however, provided that: a layer obtained from the resin composition of the present invention is designated as E; a layer obtained from an adhesive resin is designated as Ad; and a layer obtained from a thermoplastic resin is designated as T, examples of the layer structure include T/E/T, E/Ad/T, T/Ad/E/Ad/T, and the like. Each layer of these may be either a monolayer, or a multilayer.

The method for producing the multilayered structure is not particularly limited. For example, a method of melt extruding a thermoplastic resin onto a molded product obtained from the resin composition of the present invention (film, sheet. etc.); a method of coextruding the resin composition of the present invention and other thermoplastic resin; a method of coinjecting the resin composition of the present invention with a thermoplastic resin; a method of laminating a molded article formed from the resin composition of the present invention and a film or a sheet of other base material using a well-known adhesive such as an organic titanium compound, an isocyanate compound or a polyester based compound; and the like may be exemplified.

Among these methods, a method of coextruding the resin composition of the present invention and other thermoplastic resin is preferably used. The resin composition of the present invention is superior in long-run workability and appearance characteristics, and in particular, coloring is less likely to occur even if melted at a comparatively high temperature. Therefore, even if the resin composition of the present invention and other thermoplastic resin having a comparatively high melting temperature are coextruded, a multilayered structure being accompanied by suppressed occurrence of coloring such as yellowing, and being superior in the appearance can be obtained.

Examples of the thermoplastic resin used for other layer in the multilayered structure include: homopolymers of an olefin or copolymers thereof such as linear low density polyethylene, low density polyethylene, medium density polyethylene, high density polyethylene, ethylene-vinyl acetate copolymers, ethylene-propylene copolymers, polypropylene, and propylene-α-olefin copolymers (α-olefin having 4 to 20 carbon atoms), polybutene, polypentene; polyesters such as polyethylene terephthalate; polyamides such as polyester elastomers, nylon-6, and nylon-6,6; polystyrene, polyvinyl chloride, polyvinylidene chloride, acrylic resins, vinyl ester based resins, polyurethane elastomers, polycarbonate, chlorinated polyethylene, chlorinated polypropylene, and the like. Of these, polypropylene, polyethylene, ethylene-propylene copolymers, ethylene-vinyl acetate copolymers, polyamides, polystyrene, polyesters are preferably used.

The aforementioned adhesive resin is not particularly limited as long as it has adhesiveness with the resin composition that includes EVOH of the present invention and the thermoplastic resin, but adhesive resins containing a carboxylic acid modified polyolefin are preferred. As the carboxylic acid modified polyolefin, a carboxyl group-containing modified olefin-derived polymer can be suitably used which is obtained by allowing an ethylenic unsaturated carboxylic acid, an ester thereof or an anhydride of the same to be chemically bonded (for example, addition reaction, graft reaction, etc.) to an olefin-derived polymer. The olefin-derived polymer as referred to herein means polyolefins such as polyethylene (low pressure, middle pressure, high pressure), linear low density polyethylene, polypropylene and polybutane, copolymers (for example, ethylene-vinyl acetate copolymers, ethylene-ethyl acrylate copolymers, etc.) of olefin and other monomer (vinyl ester, unsaturated carboxylate ester, etc.). Among these, linear low density polyethylene, ethylene-vinyl acetate copolymers (content of vinyl acetate being 5% by mass to 55% by mass) and ethylene-ethyl acrylate copolymers (content of ethyl acrylate being 8% by mass to 35% by mass) are preferred, and linear low density polyethylene and ethylene-vinyl acetate copolymers are particularly preferred. As the ethylenic unsaturated carboxylic acid, an ester thereof or an anhydride of the same, ethylenic unsaturated monocarboxylic acids, or esters thereof, ethylenic unsaturated dicarboxylic acids, or mono- or diesters thereof, or anhydrides of the same are exemplified, and of these, ethylenic unsaturated dicarboxylic acid anhydrides are preferred. Specifically, maleic acid, fumaric acid, itaconic acid, maleic anhydride, itaconic anhydride, maleic monomethyl ester, maleic monoethyl ester, maleic diethyl ester, fumaric monomethyl ester and the like are included, and particularly, maleic anhydride is suitable.

The amount of addition or grafting (i.e., degree of modification) of the ethylenic unsaturated carboxylic acid or an anhydride thereof to the olefin-derived polymer is 0.0001 to 15% by mass and preferably 0.001 to 10% by mass with respect to the olefin-derived polymer. An addition reaction and a grafting reaction of the ethylenic unsaturated carboxylic acid or an anhydride thereof to the olefin-derived polymer can be carried out by, for example, a radical polymerization method, etc. in the presence of a solvent (e.g., xylene, etc.) and a catalyst (peroxide, etc.). The melt flow rate (MFR) measured at 210° C. of the carboxylic acid-modified polyolefin obtained in such a manner is preferably 0.2 to 30 g/10 min and further preferably 0.5 to 10 g/10 min. These adhesive resins may be used either alone, or as a mixture of two types or more thereof.

Although the process for coextrusion of the resin composition of the present invention and the thermoplastic resin, etc., is not particularly limited, a multimanifold-merging T die method, a feedblock-merging T die method, an inflation method, and the like may be exemplified.

By subjecting thus obtained coextrusion multilayered structure to secondary processing, various types of molded articles (films, sheets, tubes, bottles, etc.) can be obtained. The various types of molded articles include, for example, articles as in the following:

(1) multilayer costretched sheets or films obtained by stretching a multilayered structure (sheet or film, etc.) in an monoaxial or biaxial direction, followed by subjecting to a heat treatment;

(2) multilayer rolled sheets or films obtained by rolling a multilayered structure (sheet or film, etc.);

(3) multilayer tray cup shaped containers obtained by subjecting a multilayered structure (sheet or film, etc.) to a hot forming process such as vacuum forming, air-pressure forming or vacuum air-pressure forming; and (4) bottles, cup shaped containers and the like obtained by stretch blow molding or the like of a multilayered structure (pipe, etc.).

Note that the secondary processing is not limited to each process illustrated for obtaining the molded article described above, and for example, any well-known secondary processing other than the aforementioned processes such as blow molding may be used ad libitum.

Since the multilayered structure has a layer obtained from an resin composition that is superior in appearance characteristics and long-run workability, it is accompanied by fewer fish eyes, gels and seeds (dirt under paint) and less coloring such as yellowing and thus, for example, can be suitably used as a food container and the like such as a deep draw container, a cup shape container, and a bottle.

EXAMPLES

Hereinafter, the present invention will be explained in detail by way of Examples, but the present invention is not limited to these Examples.

In Examples/Comparative Examples described below, analyses and evaluations of the resin composition, etc. were carried out by methods shown below, respectively.

(1) Measurement of Moisture Content of Water-Containing EVOH Pellet

The moisture content of the water-containing EVOH pellet was measured using a Halogen Moisture Analyzer "HR73" manufactured by Mettler-Toledo International Inc. under a conditions including a drying temperature of 180° C., a drying time of 20 min, a sample quantity of about 10 g. The moisture content of the water-containing EVOH shown below is expressed as % by mass on the basis of dry EVOH.

(2) Ethylene Content and Degree of Saponification in (A) EVOH

Dry EVOH pellet was ground by freeze grinding. Thus resulting ground EVOH was sieved with a sieve having a nominal dimension of 1 mm (according to normal sieve standard JIS-Z8801). EVOH powder passed through the sieve in an amount of 5 g was immersed in 100 g of ion exchanged water, and the mixture was stirred at 85° C. for 4 hrs, followed by an operation of dewatering and drying repeated twice. Using thus obtained powder EVOH after washing, measurement of $^1$H-NMR was carried out under the following measurement conditions, and the degree of saponification was determined by the analysis method described below.

Measurement Conditions

Name of apparatus: manufactured by JEOL Ltd., NMR spectrometer "Lambda 500"

Observation frequency: 500 MHz

Solvent: DMSO-d6

Polymer concentration: 4% by mass

Measurement temperature: 40° C. and 95° C.

Cumulated number: 600 times

Pulse delay time: 3.836 sec

Sample rotation speed: 10 to 12 Hz

Pulse width (90° pulse): 6.75 μsec

Analysis Method

By the measurement at 40° C., a peak of hydrogen in water molecules was found at around 3.3 ppm, which overlapped with a peak in the range of 3.1 to 3.7 ppm among peaks of methine hydrogen of the vinyl alcohol units of EVOH. On the other hand, when measured at 95° C., the overlapping caused at 40° C. could be obviated; however, a peak of hydrogen of the hydroxyl groups of the vinyl alcohol units of EVOH was present at around 4 to 4.5 ppm, which overlapped with the range of 3.7 to 4 ppm of peaks of methine hydrogen of vinyl alcohol units of EVOH. Accordingly, for quantitative determination of methine hydrogen of vinyl alcohol units of EVOH (3.1 to 4 ppm), measurement data at 95° C. were employed with respect to the range of 3.1 to 3.7 ppm, and measurement data at 40° C. were employed with respect to the range of 3.7 to 4 ppm in order to avoid overlapping with peaks of hydrogen of water or hydroxyl groups. Thus, the total amount of the methine hydrogen was quantitatively determined in terms of the total value of these measurements. Note that the peak of hydrogen of water or hydroxyl group has been known to shift to a high magnetic field side by elevating the measurement temperature. Therefore, analyses were conducted as in the following using both measurement results at 40° C. and 95° C. From the spectrum obtained at 40° C. as described above, an integrated value ($I_1$) of the peak of the chemical shift at 3.7 to 4 ppm, and an integrated value ($I_2$) of the peak of the chemical shift at 0.6 to 1.8 ppm were determined. On the other hand, from the spectrum obtained at 95° C., an integrated value ($I_3$) of the peak of the chemical shift at 3.1 to 3.7 ppm, an integrated value ($I_4$) of the peak of the chemical shift at 0.6 to 1.8 ppm, and an integrated value ($I_5$) of the peak of the chemical shift at 1.9 to 2.1 ppm were determined. In this process, the peak of the chemical shift at 0.6 to 1.8 ppm principally derives from methylene hydrogen, whereas the peak of the chemical shift at 1.9 to 2.1 ppm derives from methyl hydrogen in unsaponified vinyl acetate units. From these integrated values, the ethylene content and the degree of saponification were calculated according to the following formula.

$$\text{Ethylene content (mol \%)} = \frac{3I_2I_4 - 6I_1I_4 + 6I_2I_3 + 2I_2I_5}{3I_2I_4 + 6I_1I_4 + 18I_2I_3 + 6I_2I_5} \times 100 \quad \text{[numerical formula 1]}$$

$$\text{Degree of saponification (mol \%)} = \frac{I_1/I_2 + I_3/I_4}{I_1/I_2 + I_3/I_4 + I_5/3I_4} \times 100 \quad \text{[numerical formula 2]}$$

(3) Quantitative Determination of (B1) Monocarboxylic Acid and Monocarboxylate Ion, and (B2) Multivalent Carboxylic Acid and Multivalent Carboxylate Ion The dry EVOH pellet was ground by freeze grinding. The ground EVOH obtained was sieved with a sieve having a nominal dimension of 1 mm (according to standard sieve specified in JIS-Z8801). The EVOH powder in an amount of 10 g that passed through the sieve and 50 mL of ion exchanged water were charged into a 100 mL Erlenmeyer flask equipped with a stopper, then a cooling condenser was attached thereto, and the mixture was stirred at 95° C. for 10 hrs, followed by extraction. Two mL of the resulting extraction liquid was diluted with 8 mL of ion exchanged water. The diluted extraction liquid was subjected to quantitative analysis using ion chromatography "IC7000" manufactured by Yokogawa Electric Corporation to determine the amount of carboxylic acid and carboxylate ion, whereby the amount of carboxylic acid and carboxylate ion was calculated. It is to be noted that a calibration curve produced using an aqueous acetate solution was used in quantification.

Ion Chromatography Measurement Condition:

Column: "ICE-AS-1" manufactured by Dionex IonPac

Eluent: 1.0 mmol/L octanesulfonic acid solution

Measurement temperature: 35° C.

Eluent flow rate: 1 mL/min

Amount of sample injected: 50 μL (4) Quantitative Determination of Metal Ion

The dry EVOH pellet was ground by freeze grinding. Thus obtained EVOH powder in an amount of 10 g and 50 mL of ion exchanged water were charged in a 100 mL stoppered Erlenmeyer flask equipped with a cooling condenser, and the mixture was stirred at 95° C. for 10 hrs to execute heat extraction. Thus obtained extract in a volume of 2 mL was diluted with 8 mL of ion exchanged water. Thus diluted extract was subjected to a quantitative analysis using an ICP emission spectrophotometer "Optima 4300 DV" manufactured by PerkinElmer Japan Co., Ltd., at each observation wavelength shown below, whereby the amount of each metal ion was quantitatively determined.

Na: 589.592 nm

K: 766.490 nm

Mg: 285.213 nm

Ca: 317.933 nm (5) Quantitative Determination of Phosphate Compound

The dry EVOH pellet was ground by freeze grinding. Thus obtained EVOH powder in an amount of 1.0 g, 15 mL of concentrated nitric acid and 4 mL of concentrated sulfuric acid were charged into a stoppered 100 mL Erlenmeyer flask equipped with a cooling condenser to execute heat degradation at 200 to 230° C. Thus obtained solution was diluted to 50 mL with ion exchanged water in a volumetric flask. The solution was subjected to a quantitative analysis using an ICP emission spectrophotometer "Optima 4300 DV" manufactured by PerkinElmer Japan Co., Ltd., at an observation wavelength of 214.914 nm, whereby the amount of phosphorus element was quantitatively determined, and the amount of phosphate compounds was calculated to give a value of phosphate radical.

(6) Quantitative Determination of Boron Compound

A dry EVOH pellet provided as a sample in an amount of 50 mg was completely combusted by an oxygen flask combustion method, and thus resultant combusted ash deposition was dissolved in 10 mL of a 1 mol/L aqueous nitric acid solution. The solution was subjected to a quantitative analysis using an ICP emission spectrophotometer "Optima 4300 DV" manufactured by PerkinElmer Japan Co., Ltd., at an observation wavelength of 249.667 nm, whereby the content of boron compounds was obtained in a value of boron element.

(7) Evaluation of Coloring Characteristic (Coloring Resistance)

Each dried EVOH pellet obtained in Examples and Comparative Examples in an amount of 5 g was heated and melted at 220° C. and 260° C. for 2 min in a heat compression press apparatus to produce disk-shaped samples having a thickness of 2 mm. The state of coloring of the obtained disk-shaped samples were visually confirmed and evaluated as in the following.

A: hardly colored
B: slightly colored
C: colored (yellow)
D: intensely colored (brown)

(8) Production of a Monolayer Film Using a Resin Composition

The obtained dry EVOH pellet was subjected to monolayer film casting using a 20 mm extruder "D2020" manufactured by Toyo Seiki Seisaku-sho, Ltd. (D (mm)=20, L/D=20, compression ratio=2.0, screw: full flighted) under the following condition to give a monolayer film.

Extrusion temperature: 180/260/260/260° C. (feeding zone/compression zone/metering zone/die)
Screw rotation speed: 40 rpm
Output rate: 1.3 kg/hr
Chill roll temperature: 80° C.
Winding speed: 3.1 m/min
Film thickness: 20 µm (9) Appearance Characteristic (Presence of Occurrence of Yellowing)

The monolayer film produced by the method described above was rolled up around a paper tube and the degree of coloring on the edge of the film roll was evaluated visually as in the following.

Evaluation: criteria
A: no coloring
B: somewhat yellowing
C: yellowing

(10) Long-Run Workability (Viscosity Stability)

Change in torque when 60 g of the obtained dry EVOH pellet was kneaded using Labo Plastmill (manufactured by Toyo Seiki Seisaku-sho, Ltd. "20R200"; biaxial, counter rotating type) at 100 rpm and 260° C. was measured. The torque was measured after 5 min from the beginning of kneading, and a time period was determined which was required until the torque value reached 1.5 times the aforementioned torque value after min from the beginning. This time period being longer indicates less change in the viscosity, and more superior long-run workability.

Evaluation: criteria
A: 60 min or longer
B: 40 min or longer and shorter than 60 min
C: 20 min or longer and shorter than 40 min

(11) Recyclability (Stability of Quality in Repeated Recovery and Use)

Two kg of the obtained dry EVOH pellet was pelletized using a 20 mm extruder "D2020" manufactured by Toyo Seiki Seisaku-sho, Ltd. (D (mm)=20, L/D=20, compression ratio=2.0, screw: full flighted) under the following condition. An operation of pelletizing the obtained EVOH pellet again under the same conditions was repeated four times, and then LDPE having a melt index of 1.0 g/10 min (190° C., under a load of 2160 g) was charged to replace the EVOH resin in the extruder. Thereafter, the screw of the extruder was pulled off, and the state of the resin stuck to the screw was visually confirmed and evaluated as in the following.

<Pelletizing Condition>
Extrusion temperature: 180/210/210/210° C. (feeding zone/compression zone/metering zone/die)
Screw rotation speed: 40 rpm
Output rate: 1.3 kg/hr
Number of die holes: 2
Temperature of cooling water in coagulating bath: 30° C.

<Evaluation Criteria of State of the Stuck Resin>
Evaluation: criteria
A: the resin being slightly stuck to the screw or hardly found
B: the resin being stuck to the screw in a small amount
C: the resin being stuck to the screw in a large amount
D: the resin colored being stuck to the screw in a large amount

(12) Adhesiveness

Using the obtained dry EVOH pellet, linear low-density polyethylene (LLDPE: ULTZEX 2022L, manufactured by Mitsui Chemicals, Inc.) and an adhesive resin (Bondine TX8030, manufactured by SUMICA. ATOCHEM Co. Ltd, hereinafter, may be abbreviated as "Ad"), 3 materials-5 layers multilayer films (LLDPE/Ad/EVOH/Ad/LLDPE=50 µm/10 µm/10 µm/10 µm/50 µm) were obtained by the following method under the following conditions. The obtained multilayer film was cut out into a size of 150 mm along a machine direction (MD) and 10 mm along a transverse direction (TD) immediately after the multilayer film production. Thereafter a delamination strength between the EVOH layer and the Ad layer was immediately measured by an autograph (DCS-50M, manufactured by Shimadzu Corporation) in a T-peel test method, and the evaluation was made according to the delamination strength as in the following.

<Multilayer Film Production Conditions>
Extruder:
For EVOH: 20 mmϕ extruder for laboratory use, ME-type CO-EXT (manufactured by Toyo Seiki Seisaku-sho, Ltd.)
For Ad: 25 mmϕ extruder, P25-18AC (manufactured by Osaka Seiki Kosaku K.K.)
For LLDPE: 32 mmϕ extruder, GF-32-A (manufactured by Research Laboratory of Plastics Technology Co., Ltd.)
EVOH extrusion temperature: 175/210/220/220° C. (feeding zone/compression zone/metering zone/die)
Ad extrusion temperature: 100/160/220/220° C. (feeding zone/compression zone/metering zone/die)
LLDPE extrusion temperature: 150/200/210/220° C. (feeding zone/compression zone/metering zone/die)
Die: coat hanger die with a width of 300 mm (manufactured by Research Laboratory of Plastics Technology Co., Ltd.)<

<Criteria of Evaluation of Adhesiveness>
Evaluation: criteria
A: no less than 500 g/15 mm
B: no less than 400 g/15 mm and less than 500 g/15 mm C: no less than 300 g/15 mm and less than 400 g/15 mm
D: less than 300 g/15 mm Synthesis Example 1

Synthesis of Water-Containing EVOH Pellet
(Polymerization of Ethylene-Vinyl Acetate
Copolymer)

To a 250 L pressure reactor equipped with a stirrer, a nitrogen feed port, an ethylene feed port, an initiator addition port and a delay (consecutive addition) solution addition port were charged 83.0 kg of vinyl acetate and 26.6 kg of methanol, and the temperature was elevated to 60° C. Thereafter, the system was substituted with nitrogen by nitrogen bubbling for 30 min. Next, ethylene was charged such that the reactor pressure became 3.6 MPa. As an initiator, 2,2'-azobis(4-methoxy-2,4-dimethylvaleronitrile) (AMV) was dissolved in methanol to prepare an initiator solution having a concentration of 2.5 g/L, and the solution was substituted with nitrogen by bubbling nitrogen gas. After the internal temperature of the polymerization bath was adjusted to 60° C., 362 mL of the initiator solution was injected to initiate polymerization. During the polymerization, ethylene was introduced to maintain the reactor pressure of 3.6 MPa and the polymerization temperature of 60° C., and the initiator solution was continuously added at 1,120 mL/hr using the aforementioned initiator solution to perform polymerization. 5.0 hrs later, the polymerization was stopped by cooling when the polymerization conversion reached 40%. After the reactor was opened to remove ethylene, nitrogen gas was bubbled to completely eliminate ethylene. Next, the resulting copolymer solution was continuously supplied through an upper part of a tower filled with Raschig ring, and methanol vapor was blown through a lower part of the tower. Mixed vapor of methanol and unreacted vinyl acetate monomer was allowed to outflow through the top of the tower, whereby a methanol solution of an ethylene-vinyl acetate copolymer (EVAc) was obtained from which unreacted vinyl acetate monomer had been removed through the bottom of the tower.

(Saponification)

To thus obtained EVAc solution was added methanol to adjust a concentration of 15% by mass. To 253.4 kg of thus prepared methanol solution of EVAc (38 kg of EVAc in the solution) was added 76.6 L of an alkali solution (10% by mass NaOH solution in methanol, molar ratio (MR) relative to vinyl acetate units in EVAc:0.4) and the mixture was stirred at 60° C. for 4 hrs to carry out saponification of EVAc. After 6 hrs from starting the reaction, the reaction liquid was neutralized by adding 9.2 kg of acetic acid and 60 L of water to terminate the reaction.

(Washing)

The neutralized reaction liquid was transferred from the reactor to a metal drum, and left to stand at room temperature for 16 hrs, thereby permitting cooling and hardening to give a cake form. Thereafter, liquid was removed from the resin in the cake form using a centrifugal separator ("H-130" manufactured by Kokusan Centrifuge Co., Ltd., number of revolution: 1,200 rpm). Next, a step of washing the resin with water was conducted for 10 hrs in which washing was carried out while continuously supplying ion exchanged water to the central portion of the centrifugal separator from above. The conductivity of the washing liquid after 10 hrs from starting washing was 30 µS/cm (measured with "CM-30ET" manufactured by TOA Electronics Ltd.).

(Pelletizing)

The EVOH in the form of powder obtained in this manner was dried using a dryer at 60° C. for 48 hrs. The dry EVOH in the form of powder in an amount of 20 kg was dissolved in 43 L of a water/methanol mixed solvent (mass ratio: water/methanol=4/6) while stirring at 80° C. for 12 hrs. Next, the stirring was stopped, and the temperature of the dissolving vessel was lowered to 65° C. By leaving to stand for 5 hrs, degassing of the water/methanol solution of EVOH was carried out. Then, the EVOH was extruded from a die plate provided with a circular opening having a diameter of 3.5 mm into a water/methanol mixed solution (mass ratio: water/methanol=9/1) at 5° C. to allow for coagulation to give a strand form, and cut to obtain a water-containing EVOH pellet having a diameter of about 4 mm and a length of about 5 mm.

(Purification)

Thus obtained water-containing EVOH pellet in an amount of 40 kg and 150 L of ion exchanged water were placed in a metal drum having a height of 900 mm and an opening diameter of 600 mm. An operation of washing at 25° C. for 2 hrs while stirring, and dewatering the liquid was repeated twice. Next, 150 L of 1 g/L aqueous acetic acid solution was added to 30 kg of the water-containing EVOH pellet, and an operation of washing at 25° C. for 2 hrs while stirring, and dewatering the liquid was repeated twice. Furthermore, 150 L of ion exchanged water was added to 30 kg of the water-containing EVOH pellet, and an operation of washing at 25° C. for 2 hrs while stirring, and dewatering the liquid was repeated six times, whereby a water-containing EVOH pellet (w-EVOH-1) was obtained from which impurities such as byproducts in the saponifying step had been removed. The conductivity of the washing liquid after carrying out the sixth washing was measured with "CM-30ET" manufactured by TOA Electronics Ltd., and as a result, the washing liquid was revealed to have a conductivity of 3 µS/cm. Thus resulting water-containing EVOH pellet had a water content of 110% by mass.

Synthesis Example 2

Synthesis of Water-Containing EVOH Pellet

A methanol solution of the EVAc from which unreacted vinyl acetate had been removed was obtained according to an operation similar to Synthesis Example 1 except that: the amounts of vinyl acetate and methanol charged in polymerization of the ethylene-vinyl acetate copolymer were changed to 85.2 kg and 32.3 kg, respectively; the pressure in the reaction tank was changed to 2.9 MPa; the amount of the initiator solution (methanol solution of AMV having a concentration of 2.5 g/L) injected upon initiation of the polymerization was changed to 310 mL; and the amount of the initiator solution continuously added was changed to 950 mL/hr in Synthesis Example 1. The reaction time of the polymerization reaction was 5 hrs and the polymerization conversion was 40%.

Next, saponification and washing were carried out to obtain a particulate EVOH according to an operation similar to Synthesis Example 1 except that the amount of the alkali solution added was changed to 78.9 L and the amount of acetic acid added for the neutralization was changed to 9.5 kg.

Furthermore, coagulation and washing were carried out to obtain a water-containing EVOH pellet (w-EVOH-2) according to an operation similar to Synthesis Example 1 except that the mass ratio of water/methanol in the water/methanol mixed solution used in dissolution of the EVOH was changed to 50/50.

Synthesis Example 3

Synthesis of Water-Containing EVOH Pellet

A methanol solution of the EVAc from which unreacted vinyl acetate had been removed was obtained according to an operation similar to Synthesis Example 1 except that: the amounts of vinyl acetate and methanol charged in polymerization of the ethylene-vinyl acetate copolymer were changed to 76.7 kg and 11.0 kg, respectively; the pressure in the reaction tank was changed to 5.5 MPa; the amount of the initiator solution (methanol solution of AMV having a concentration of 2.5 g/L) injected upon initiation of the polymerization was changed to 510 mL; and the amount of the initiator solution continuously added was changed to 1,570 mL/hr in Synthesis Example 1. The reaction time of the polymerization reaction was 5 hrs and the polymerization conversion was 40%.

Next, saponification and washing were carried out to obtain a particulate EVOH according to an operation similar to Synthesis Example 1 except that the amount of the alkali solution added was changed to 70.4 L and the amount of acetic acid added for the neutralization was changed to 8.4 kg.

Furthermore, coagulation and washing were carried out to obtain a water-containing EVOH pellet (w-EVOH-3) according to an operation similar to Synthesis Example 1 except that the mass ratio of water/methanol in the water/methanol mixed solution used in dissolution of the EVOH was changed to 25/75.

Synthesis Example 4

Synthesis of Water-Containing EVOH Pellet

A methanol solution of the EVAc from which unreacted vinyl acetate had been removed was obtained according to an operation similar to Synthesis Example 1 except that: the amounts of vinyl acetate and methanol charged in polymerization of the ethylene-vinyl acetate copolymer were changed to 102.0 kg and 17.7 kg, respectively; the pressure in the reaction tank was changed to 2.9 MPa; the amount of the initiator solution (methanol solution of AMV having a concentration of 2.5 g/L) injected upon initiation of the polymerization was changed to 280 mL; and the amount of the initiator solution continuously added was changed to 850 mL/hr in Synthesis Example 1. The reaction time of the polymerization reaction was 5 hrs and the polymerization conversion was 40%.

Next, saponification and washing were carried out to obtain a particulate EVOH according to an operation similar to Synthesis Example 1 except that the amount of the alkali solution added was changed to 80.1 L and the amount of acetic acid added for the neutralization was changed to 9.6 kg.

Furthermore, coagulation and washing were carried out to obtain a water-containing EVOH pellet (w-EVOH-4) according to an operation similar to Synthesis Example 1 except that the mass ratio of water/methanol in the water/methanol mixed solution used in dissolution of the EVOH was changed to 55/45.

Example 1

Into 94.5 L of an aqueous solution prepared by dissolving each component in water so as to give 0.05 g/L citric acid, 0.55 g/L trisodium citrate, 0.015 g/L phosphoric acid and 0.20 g/L boric acid was charged 10.5 kg of the water-containing EVOH pellet (w-EVOH-1) obtained in Synthesis Example 1, and the mixture was subjected to immersion at 25° C. for 6 hrs with occasional stirring. The water-containing EVOH pellet after the immersion was dewatered using centrifugal dehydrator, and then dried in a hot-air dryer at 80° C. for 3 hrs, followed by drying at 120° C. for 24 hrs to obtain a pellet of a dry EVOH resin composition (EVOH-1)

When EVOH-1 was analyzed for the ethylene content and the degree of saponification according to the procedure described above, the ethylene content (Et) was 32 mol % and the degree of saponification (DS) was no less than 99.98 mol %. In addition, as a result of the analysis according to the procedure described above, the EVOH-1 contained 2.6 μmol/g of citric acid and citrate ion as the multivalent carboxylic acid and multivalent carboxylate ion (B2), 7.0 μmol/g of sodium ion as the metal ion (C), 10 ppm of the phosphate compound (D) in a value of phosphate radical, and 156 ppm of the boron compound (E) in a value of boron element. Evaluation of the EVOH-1 for each physical property according to the procedure described above revealed the coloring characteristic decided as "A" since coloring was hardly seen at both 220° C. and 260° C., and the appearance characteristic decided as "A" since coloring was not seen on the edge of the film roll. In addition, the long-run workability was decided as "A" since even after 60 min the torque value did not reach one and a half times the torque value after 5 min, and the adhesiveness was decided as "A" since the delamination strength was 510 g/15 mm.

Examples 2 to 31 and Comparative Examples 1 to 11

The EVOH resin composition pellets (EVOH-2 to 31, and 34 to 44) were obtained in a similar manner to Example 1 except that the type of the water-containing EVOH pellet, and the type and amount of each compound blended with the aqueous solution were changed as shown in Table 1 and Table 4. The obtained each EVOH resin composition was analyzed and evaluated in a manner similar to Example 1. The results of the analysis of the ethylene content, etc. are shown in Table 2 and Table 5, and the results of the evaluation of the coloring resistance, etc. are shown in Table 3 and Table 6.

Example 32

A water-containing EVOH pellet (w-EVOH-5) was obtained similarly to Synthesis Example 1 except that 30 g of "N,N'-hexamethylenebis(3,5-di-t-butyl-4-hydroxy-hydrocinnamamide)" (Irganox 1098, manufactured by Ciba Specialty Chemicals) that is an antioxidant was added when the EVOH was dissolved in the water/methanol mixed solution in the pelletizing step in the Synthesis Example 1 and thereafter purification was carried out according to an operation similar to Example 1. Furthermore, a pellet of a dry EVOH resin composition (EVOH-32) was obtained according to an operation similar to Example 1 except that w-EVOH-5 was used in place of w-EVOH-1.

Example 33

A water-containing EVOH pellet (w-EVOH-6) was obtained similarly to Example 32 except that the amount of "N,N'-hexamethylenebis(3,5-di-t-butyl-4-hydroxy-hydrocinnamamide)" added was changed to 5 g, followed by purification according to an operation similar to Example 32. Furthermore, a pellet of a dry EVOH resin composition (EVOH-33) was obtained according to an operation similar to Example 1 except that w-EVOH-6 was used in place of w-EVOH-1.

The EVOH-32 and the EVOH-33 were analyzed and evaluated in a manner similar to Example 1. The results of the analysis of the ethylene content, etc. are shown in Table 2, and the results of evaluating coloring resistance are together shown in Table 3.

TABLE 1

| | Water-containing EVOH | Et mol % | DS mol % | Carboxylic acid/metal ion Numbers in parenthesis indicating blended concentration (unit: g/L) | Phosphoric acid g/L | Boric acid g/L | |
|---|---|---|---|---|---|---|---|
| Example 1 | w-EVOH-1 | 32 | 99.98 | citric acid (0.05)/trisodium citrate (0.55) | 0.015 | 0.20 | EVOH-1 |
| Example 2 | w-EVOH-1 | 32 | 99.98 | citric acid (2.06)/trisodium citrate (0.55) | 0.015 | 0.20 | EVOH-2 |
| Example 3 | w-EVOH-1 | 32 | 99.98 | citric acid (1.02)/trisodium citrate (0.59) | 0.015 | 0.20 | EVOH-3 |
| Example 4 | w-EVOH-1 | 32 | 99.98 | trisodium citrate (0.095)/sodium hydroxide (0.008) | 0.015 | 0.20 | EVOH-4 |
| Example 5 | w-EVOH-1 | 32 | 99.98 | trisodium citrate (0.019)/sodium hydroxide (0.009) | 0.015 | 0.20 | EVOH-5 |
| Example 6 | w-EVOH-1 | 32 | 99.98 | citric acid (0.01)/trisodium citrate (1.38) | 0.015 | 0.20 | EVOH-6 |
| Example 7 | w-EVOH-1 | 32 | 99.98 | citric acid (0.09)/trisodium citrate (1.02) | 0.015 | 0.20 | EVOH-7 |
| Example 8 | w-EVOH-1 | 32 | 99.98 | citric acid (0.17)/trisodium citrate (0.34) | 0.015 | 0.20 | EVOH-8 |
| Example 9 | w-EVOH-1 | 32 | 99.98 | citric acid (0.42)/trisodium citrate (0.24) | 0.015 | 0.20 | EVOH-9 |
| Example 10 | w-EVOH-1 | 32 | 99.98 | citric acid (0.05)/tripotassium citrate (0.65) | 0.015 | 0.20 | EVOH-10 |
| Example 11 | w-EVOH-1 | 32 | 99.98 | citric acid (2.11)/tripotassium citrate (0.89) | 0.015 | 0.20 | EVOH-11 |
| Example 12 | w-EVOH-1 | 32 | 99.98 | tripotassium citrate (0.02)/potassium hydroxide (0.013) | 0.015 | 0.20 | EVOH-12 |
| Example 13 | w-EVOH-4 | 24 | 99.98 | citric acid (0.03)/trisodium citrate (0.58) | 0.009 | 0.00 | EVOH-13 |
| Example 14 | w-EVOH-3 | 44 | 99.98 | citric acid (0.05)/trisodium citrate (0.55) | 0.030 | 0.29 | EVOH-14 |
| Example 15 | w-EVOH-1 | 32 | 99.98 | malic acid (0.02)/disodium malate (0.60) | 0.015 | 0.20 | EVOH-15 |
| Example 16 | w-EVOH-1 | 32 | 99.98 | disodium malate (0.51)/sodium hydroxide (0.09) | 0.015 | 0.20 | EVOH-16 |
| Example 17 | w-EVOH-2 | 27 | 99.98 | dipotassium malate (0.34)/potassium hydroxide (0.004) | 0.012 | 0.12 | EVOH-17 |
| Example 18 | w-EVOH-1 | 32 | 99.98 | dipotassium tartarate (0.64)/potassium hydroxide (0.003) | 0.015 | 0.20 | EVOH-18 |
| Example 19 | w-EVOH-1 | 32 | 99.98 | tartaric acid (0.07)/dipotassium tartarate (0.39) | 0.015 | 0.20 | EVOH-19 |
| Example 20 | w-EVOH-3 | 44 | 99.98 | tartaric acid (0.55)/disodium tartarate (0.73) | 0.015 | 0.29 | EVOH-20 |
| Example 21 | w-EVOH-1 | 32 | 99.98 | citric acid (0.05)/trisodium citrate (0.55) | 0.015 | 0.07 | EVOH-21 |
| Example 22 | w-EVOH-1 | 32 | 99.98 | citric acid (0.05)/trisodium citrate (0.55) | 0.015 | 0.00 | EVOH-22 |
| Example 23 | w-EVOH-1 | 32 | 99.98 | citric acid (0.05)/trisodium citrate (0.55) | 0.000 | 0.49 | EVOH-23 |
| Example 24 | w-EVOH-1 | 32 | 99.98 | citric acid (0.05)/trisodium citrate (0.55) | 0.000 | 0.00 | EVOH-24 |
| Example 25 | w-EVOH-1 | 32 | 99.98 | mucin acid (0.10)/disodium mucinate (0.81) | 0.015 | 0.20 | EVOH-25 |
| Example 26 | w-EVOH-1 | 32 | 99.98 | BTCA (0.01)/tetrasodium BTCA(0.51) | 0.015 | 0.20 | EVOH-26 |
| Example 27 | w-EVOH-1 | 32 | 99.98 | 3KGA (0.05)/disodium 3KGA (0.61) | 0.015 | 0.20 | EVOH-27 |
| Example 28 | w-EVOH-1 | 32 | 99.98 | malonic acid (0.05)/disodium malonate (0.47) | 0.015 | 0.20 | EVOH-28 |
| Example 29 | w-EVOH-1 | 32 | 99.98 | succinic acid (0.05)/disodium succinate (0.86) | 0.015 | 0.20 | EVOH-29 |
| Example 30 | w-EVOH-1 | 32 | 99.98 | Asp (0.10)/disodium Asp (0.56) | 0.015 | 0.20 | EVOH-30 |
| Example 31 | w-EVOH-1 | 32 | 99.98 | adipic acid (0.08)/disodium adipate (0.61) | 0.015 | 0.20 | EVOH-31 |
| Example 32 | w-EVOH-5 | 32 | 99.98 | citric acid (0.62)/trisodium citrate (0.24) | 0.015 | 0.20 | EVOH-32 |
| Example 33 | w-EVOH-6 | 32 | 99.98 | disodium malate (0.43)/sodium hydroxide (0.004) | 0.015 | 0.20 | EVOH-33 |

BTCA: 1,2,3,4-butanetetracarboxylic acid,
3KGA: 3-ketoglutaric acid,
Asp: aspartic acid

TABLE 2

| | | Et mol % | DS mol % | (B1) Type | (B1) Content μmol/g | (B2) Type | (B2) Content μmol/g | (C) Type | (C) Content μmol/g | (B2)/(C) Molar ratio | (D) Content in a value of phosphate radical ppm | (E) Content in a value of boron element ppm | Content in a value of boric acid ppm |
|---|---|---|---|---|---|---|---|---|---|---|---|---|---|
| Example 1 | EVOH-1 | 32 | 99.98 | — | — | citric acid | 2.6 | Na | 7.0 | 0.371 | 10 | 156 | 890 |
| Example 2 | EVOH-2 | 32 | 99.98 | — | — | citric acid | 13.0 | Na | 7.0 | 1.857 | 10 | 156 | 890 |
| Example 3 | EVOH-3 | 32 | 99.98 | — | — | citric acid | 7.8 | Na | 7.5 | 1.040 | 10 | 156 | 890 |
| Example 4 | EVOH-4 | 32 | 99.98 | — | — | citric acid | 0.4 | Na | 5.2 | 0.077 | 10 | 156 | 890 |
| Example 5 | EVOH-5 | 32 | 99.98 | — | — | citric acid | 0.08 | Na | 4.7 | 0.017 | 10 | 156 | 890 |
| Example 6 | EVOH-6 | 32 | 99.98 | — | — | citric acid | 5.9 | Na | 17.5 | 0.337 | 10 | 156 | 890 |
| Example 7 | EVOH-7 | 32 | 99.98 | — | — | citric acid | 4.8 | Na | 13.0 | 0.369 | 10 | 156 | 890 |
| Example 8 | EVOH-8 | 32 | 99.98 | — | — | citric acid | 2.3 | Na | 4.3 | 0.535 | 10 | 156 | 890 |
| Example 9 | EVOH-9 | 32 | 99.98 | — | — | citric acid | 3.2 | Na | 3.0 | 1.067 | 10 | 156 | 890 |
| Example 10 | EVOH-10 | 32 | 99.98 | — | — | citric acid | 2.6 | K | 7.0 | 0.371 | 10 | 156 | 890 |
| Example 11 | EVOH-11 | 32 | 99.98 | — | — | citric acid | 14.1 | K | 9.5 | 1.484 | 10 | 156 | 890 |
| Example 12 | EVOH-12 | 32 | 99.98 | — | — | citric acid | 0.07 | K | 4.8 | 0.015 | 10 | 156 | 890 |
| Example 13 | EVOH-13 | 24 | 99.98 | — | — | citric acid | 2.6 | Na | 7.4 | 0.351 | 6 | 0 | 0 |
| Example 14 | EVOH-14 | 44 | 99.98 | — | — | citric acid | 2.6 | Na | 7.0 | 0.371 | 20 | 227 | 1300 |
| Example 15 | EVOH-15 | 32 | 99.98 | — | — | malic acid | 3.7 | Na | 7.0 | 0.529 | 10 | 156 | 890 |
| Example 16 | EVOH-16 | 32 | 99.98 | — | — | malic acid | 3.0 | Na | 10.4 | 0.288 | 10 | 156 | 890 |
| Example 17 | EVOH-17 | 27 | 99.98 | — | — | malic acid | 1.8 | K | 5.0 | 0.360 | 8 | 96 | 550 |
| Example 18 | EVOH-18 | 32 | 99.98 | — | — | tartaric acid | 3.0 | K | 7.0 | 0.429 | 10 | 156 | 890 |
| Example 19 | EVOH-19 | 32 | 99.98 | — | — | tartaric acid | 2.3 | K | 3.6 | 0.639 | 10 | 156 | 890 |
| Example 20 | EVOH-20 | 44 | 99.98 | — | — | tartaric acid | 7.5 | Na | 7.0 | 1.071 | 10 | 227 | 1300 |
| Example 21 | EVOH-21 | 32 | 99.98 | — | — | citric acid | 2.6 | K | 7.0 | 0.371 | 10 | 52 | 300 |
| Example 22 | EVOH-22 | 32 | 99.98 | — | — | citric acid | 2.6 | K | 7.0 | 0.371 | 10 | 0 | 0 |
| Example 23 | EVOH-23 | 32 | 99.98 | — | — | citric acid | 2.6 | K | 7.0 | 0.371 | 0 | 384 | 2200 |

TABLE 2-continued

| | | Et mol % | DS mol % | (B1) Type | (B1) Content μmol/g | (B2) Type | (B2) Content μmol/g | (C) Type | (C) Content μmol/g | (B2)/(C) Molar ratio | (D) Content in a value of phosphate radical ppm | (E) Content in a value of boron element ppm | Content in a value of boric acid ppm |
|---|---|---|---|---|---|---|---|---|---|---|---|---|---|
| Example 24 | EVOH-24 | 32 | 99.98 | — | — | citric acid | 2.6 | K | 7.0 | 0.371 | 0 | 0 | 0 |
| Example 25 | EVOH-25 | 32 | 99.98 | — | — | mucin acid | 4.0 | Na | 7.0 | 0.571 | 10 | 156 | 890 |
| Example 26 | EVOH-26 | 32 | 99.98 | — | — | 1,2,3,4-butanetetra-carboxylic acid | 1.8 | Na | 7.0 | 0.257 | 10 | 156 | 890 |
| Example 27 | EVOH-27 | 32 | 99.98 | — | — | 3-ketoglutaric acid | 3.9 | Na | 7.0 | 0.557 | 10 | 156 | 890 |
| Example 28 | EVOH-28 | 32 | 99.98 | — | — | malonic acid | 4.0 | Na | 7.0 | 0.571 | 10 | 156 | 890 |
| Example 29 | EVOH-29 | 32 | 99.98 | — | — | succinic acid | 4.0 | Na | 7.0 | 0.571 | 10 | 156 | 890 |
| Example 30 | EVOH-30 | 32 | 99.98 | — | — | aspartic acid | 4.3 | Na | 7.0 | 0.614 | 10 | 156 | 890 |
| Example 31 | EVOH-31 | 32 | 99.98 | — | — | adipic acid | 4.1 | Na | 7.0 | 0.586 | 10 | 156 | 890 |
| Example 32 | EVOH-32 | 32 | 99.98 | — | — | citric acid | 4.2 | Na | 3.0 | 1.400 | 10 | 156 | 890 |
| Example 33 | EVOH-33 | 32 | 99.98 | — | — | malic acid | 2.5 | Na | 7.0 | 0.357 | 10 | 156 | 890 |

TABLE 3

| | Coloring resistance 220° C. | Coloring resistance 260° C. | Appearance characteristic | Long-run workability | Adhesiveness |
|---|---|---|---|---|---|
| Example 1 | A | A | A | A | A |
| Example 2 | A | B | B | B | A |
| Example 3 | A | A | A | A | A |
| Example 4 | A | A | A | A | A |
| Example 5 | B | B | B | A | A |
| Example 6 | A | B | B | A | A |
| Example 7 | A | B | A | A | A |
| Example 8 | A | A | A | A | A |
| Example 9 | B | A | A | A | B |
| Example 10 | A | A | A | A | A |
| Example 11 | A | B | B | B | A |
| Example 12 | B | B | B | A | A |
| Example 13 | A | A | A | B | A |
| Example 14 | A | A | A | A | A |
| Example 15 | A | B | A | A | A |
| Example 16 | A | B | A | A | A |
| Example 17 | A | B | A | A | A |
| Example 18 | A | A | A | A | A |
| Example 19 | A | B | A | A | B |
| Example 20 | A | A | A | B | A |
| Example 21 | A | A | A | B | A |
| Example 22 | A | A | A | B | A |
| Example 23 | B | A | B | A | A |
| Example 24 | B | A | B | A | A |
| Example 25 | B | A | B | A | A |
| Example 26 | B | B | B | B | A |
| Example 27 | B | B | B | A | B |
| Example 28 | B | B | B | A | B |
| Example 29 | B | B | B | A | B |
| Example 30 | B | B | B | A | B |
| Example 31 | B | B | B | B | B |
| Example 32 | A | A | A | A | B |
| Example 33 | A | B | A | A | A |

TABLE 4

| | Water-containing EVOH | Et mol % | DS mol % | Type and concentration of component blended with aqueous solution — Carboxylic acid/metal ions Numbers in parenthesis indicating blended concentration (unit: g/L) | Phosphoric g/L | Boric acid g/L | |
|---|---|---|---|---|---|---|---|
| Comparative Example 1 | w-EVOH-1 | 32 | 99.98 | sodium acetate (0.19)/sodium hydroxide (0.009) | 0.015 | 0.20 | EVOH-34 |
| Comparative Example 2 | w-EVOH-1 | 32 | 99.98 | acetic acid (0.03)/sodium acetate (0.52) | 0.015 | 0.20 | EVOH-35 |
| Comparative Example 3 | w-EVOH-1 | 32 | 99.98 | sodium acetate (0.06)/sodium hydroxide (0.012) | 0.015 | 0.20 | EVOH-36 |
| Comparative Example 4 | w-EVOH-1 | 32 | 99.98 | sodium lactate (0.11)/sodium hydroxide (0.006) | 0.015 | 0.20 | EVOH-37 |
| Comparative Example 5 | w-EVOH-1 | 32 | 99.98 | sodium lactate (0.25)/sodium hydroxide (0.009) | 0.015 | 0.20 | EVOH-38 |
| Comparative Example 6 | w-EVOH-1 | 32 | 99.98 | Sodium pyruvate (0.25)/sodium hydroxide (0.009) | 0.015 | 0.20 | EVOH-39 |
| Comparative Example 7 | w-EVOH-1 | 32 | 99.98 | alanine (0.20)/sodium hydroxide (0.009) | 0.015 | 0.20 | EVOH-40 |
| Comparative Example 8 | w-EVOH-1 | 32 | 99.98 | trisodium citrate (0.001)/sodium hydroxide (0.014) | 0.015 | 0.20 | EVOH-41 |
| Comparative Example 9 | w-EVOH-1 | 32 | 99.98 | citric acid (3.77)/trisodium citrate (0.55) | 0.015 | 0.20 | EVOH-42 |
| Comparative Example 10 | w-EVOH-1 | 32 | 99.98 | tartaric acid (0.27)/disodium tartarate (0.12) | 0.015 | 0.20 | EVOH-43 |

TABLE 4-continued

| | Water-containing EVOH | Et mol % | DS mol % | Type and concentration of component blended with aqueous solution Carboxylic acid/metal ions Numbers in parenthesis indicating blended concentration (unit: g/L) | Phosphoric g/L | Boric acid g/L | |
|---|---|---|---|---|---|---|---|
| Comparative Example 11 | w-EVOH-1 | 32 | 99.98 | disodium tartarate (0.013)/sodium hydroxide (0.066) | 0.015 | 0.20 | EVOH-44 |

TABLE 5

| | | Et mol % | DS mol % | (B1) Type | (B1) Content μmol/g | (B2) Type | (B2) Content μmol/g | (C) Type | (C) Content μmol/g | (B2)/(C) Molar ratio | (D) Content in a value of phosphate radical ppm | (E) Content in a value of boron element ppm | Content in a value of boric acid ppm |
|---|---|---|---|---|---|---|---|---|---|---|---|---|---|
| Comparative Example 1 | EVOH-34 | 32 | 99.98 | acetic acid | 2.5 | — | — | Na | 7.0 | 0.000 | 10 | 156 | 890 |
| Comparative Example 2 | EVOH-35 | 32 | 99.98 | acetic acid | 7.5 | — | — | Na | 7.0 | 0.000 | 10 | 156 | 890 |
| Comparative Example 3 | EVOH-36 | 32 | 99.98 | acetic acid | 0.8 | — | — | Na | 7.0 | 0.000 | 10 | 156 | 890 |
| Comparative Example 4 | EVOH-37 | 32 | 99.98 | lactic acid | 1.1 | — | — | Na | 7.0 | 0.000 | 10 | 156 | 890 |
| Comparative Example 5 | EVOH-38 | 32 | 99.98 | lactic acid | 2.5 | — | — | Na | 7.0 | 0.000 | 10 | 156 | 890 |
| Comparative Example 6 | EVOH-39 | 32 | 99.98 | pyruvic acid | 2.5 | — | — | Na | 7.0 | 0.000 | 10 | 156 | 890 |
| Comparative Example 7 | EVOH-40 | 32 | 99.98 | alanine | 2.5 | — | — | Na | 7.0 | 0.000 | 10 | 156 | 890 |
| Comparative Example 8 | EVOH-41 | 32 | 99.98 | — | — | citric acid | 0.005 | Na | 7.0 | 0.001 | 10 | 156 | 890 |
| Comparative Example 9 | EVOH-42 | 32 | 99.98 | — | — | citric acid | 21.9 | Na | 7.0 | 3.129 | 10 | 156 | 890 |
| Comparative Example 10 | EVOH-43 | 32 | 99.98 | — | — | tartaric acid | 2.5 | Na | 1.1 | 2.273 | 10 | 156 | 890 |
| Comparative Example 11 | EVOH-44 | 32 | 99.98 | — | — | tartaric acid | 0.06 | Na | 33 | 0.0018 | 10 | 156 | 890 |

TABLE 6

| | Coloring resistance 220° C. | Coloring resistance 260° C. | Appearance characteristic | Long-run workability | Adhesiveness |
|---|---|---|---|---|---|
| Comparative Example 1 | B | D | C | A | B |
| Comparative Example 2 | B | C | C | A | B |
| Comparative Example 3 | B | D | C | A | B |
| Comparative Example 4 | B | C | C | A | B |
| Comparative Example 5 | B | B | C | B | C |
| Comparative Example 6 | B | D | C | A | B |
| Comparative Example 7 | C | D | C | C | C |
| Comparative Example 8 | B | C | C | A | A |
| Comparative Example 9 | C | B | B | C | B |
| Comparative Example 10 | B | B | B | C | D |
| Comparative Example 11 | D | D | C | C | A |

Example 34

Into 94.5 L of an aqueous solution prepared by dissolving each component in water so as to give 0.24 g/L citric acid, 0.50 g/L magnesium citrate hexahydrate (synthesized according to a method described in Japanese Unexamined Patent Application, Publication No. 2004-91442), 0.015 g/L phosphoric acid and 0.20 g/L boric acid was placed 10.5 kg of the water-containing EVOH pellet (w-EVOH-1) obtained in Synthesis Example 1, and the mixture was subjected to immersion at 25° C. for 6 hrs with occasional stirring. The water-containing EVOH pellet after the immersion was deawatered using centrifugal dehydrator, and then dried in a hot-air dryer at 80° C. for 3 hrs, followed by drying at 120° C. for 24 hrs to obtain a pellet of a dry EVOH resin composition (EVOH-45).

When EVOH-45 was analyzed for the ethylene content and the degree of saponification according to the procedure described above, the ethylene content was 32 mol % and the degree of saponification was no less than 99.98 mol %. In addition, as a result of the analysis according to the procedure described above, the EVOH-45 contained 3.2 μmol/g of citric acid and citrate ion as the multivalent carboxylic acid and multivalent carboxylate ion (B2), 2.9 μmol/g of magnesium ion as the metal ion (C), 10 ppm of the phosphate compound (D) in a value of phosphate radical, and 156 ppm of the boron compound (E) in a value of boron element. Evaluation of the EVOH-45 for each physical property according to the procedure described above revealed the coloring characteristic decided as "A" since coloring was hardly seen at both 220° C. and 260° C., and the appearance characteristic decided as "A" since coloring was not seen on the edge of the film roll. In addition, the recyclability was decided as "A" since the resin stuck to the screw of the extruder was hardly seen after repeated pelletizing, and the adhesiveness was decided as "B" since the delamination strength was 460 g/15 mm.

Examples 35 to 45 and Comparative Examples 12 to 15

The EVOH resin composition pellets (EVOH-46 to 60) were obtained in a similar manner to Example 34 except that the type of the water-containing EVOH pellet, and the type and amount of each compound blended with the aqueous solution were changed as shown in Table 7. The obtained each EVOH resin composition was analyzed and evaluated in a manner similar to Example 34. The results of the analysis of the ethylene content, etc. are shown in Table 8, and the results of the evaluation of the coloring resistance, etc. are shown in Table 9.

TABLE 7

| | Water-containing EVOH | Et mol % | DS mol % | Type and concentration of component blended into aqueous solution | Phosphoric acid g/L | Boric acid g/L | |
|---|---|---|---|---|---|---|---|
| | | | | Carboxylic acid/metal ions Numbers in parenthesis indicating blended concentration (unit: g/L) | | | |
| Example 34 | w-EVOH-1 | 32 | 99.98 | citric acid (0.24)/magnesium citrate (0.50) | 0.015 | 0.20 | EVOH-45 |
| Example 35 | w-EVOH-1 | 32 | 99.98 | citric acid (1.48)/calcium citrate (0.48) | 0.015 | 0.20 | EVOH-46 |
| Example 36 | w-EVOH-3 | 44 | 99.98 | citric acid (0.52)/calcium carbonate (0.35) | 0.015 | 0.33 | EVOH-47 |
| Example 37 | w-EVOH-1 | 32 | 99.98 | citric acid (0.16)/magnesium citrate (0.35)/trisodium citrate (0.38)/potassium dihydrogen phosphate (0.24) | 0 | 0.20 | EVOH-48 |
| Example 38 | w-EVOH-1 | 32 | 99.98 | magnesium citrate (0.35)/trisodium citrate (0.57)/potassium dihydrogen phosphate (0.24)/sodium hydroxide (0.01) | 0 | 0.20 | EVOH-49 |
| Example 39 | w-EVOH-3 | 44 | 99.98 | citric acid (1.16)/magnesium citrate (0.35)/trisodium citrate (0.38)/potassium dihydrogen phosphate (0.24) | 0 | 0.33 | EVOH-50 |
| Example 40 | w-EVOH-1 | 32 | 99.98 | tartaric acid (0.18)/disodium tartarate (0.50)/dipotassium tartarate (0.19)/calcium carbonate (0.23) | 0.14 | 0.20 | EVOH-51 |
| Example 41 | w-EVOH-1 | 32 | 99.98 | tartaric acid (1.26)/disodium tartarate (0.50)/dipotassium tartarate (0.19)/calcium carbonate (0.23) | 0.11 | 0.20 | EVOH-52 |
| Example 42 | w-EVOH-1 | 32 | 99.98 | tartaric acid (0.73)/disodium tartarate (0.50)/dipotassium tartarate (0.19)/calcium carbonate (0.23) | 0.14 | 0.20 | EVOH-53 |
| Example 43 | w-EVOH-1 | 32 | 99.98 | dipotassium tartarate (0.64)/potassium hydroxide (0.003) | 0.015 | 0.20 | EVOH-54 |
| Example 44 | w-EVOH-1 | 32 | 99.98 | tartaric acid (0.07)/dipotassium tartarate (0.39) | 0.015 | 0.20 | EVOH-55 |
| Example 45 | w-EVOH-3 | 44 | 99.98 | tartaric acid (0.55)/disodium tartarate (0.73) | 0.015 | 0.33 | EVOH-56 |
| Comparative Example 12 | w-EVOH-1 | 32 | 99.98 | calcium acetate (0.22)/calcium hydroxide (0.016) | 0.015 | 0.20 | EVOH-57 |
| Comparative Example 13 | w-EVOH-1 | 32 | 99.98 | calcium citrate (0.001)/calcium hydroxide (0.02) | 0.015 | 0.20 | EVOH-58 |
| Comparative Example 14 | w-EVOH-1 | 32 | 99.98 | citric acid (3.32)/magnesium citrate (1.20) | 0.015 | 0.20 | EVOH-59 |
| Comparative Example 15 | w-EVOH-1 | 32 | 99.98 | tartaric acid (0.008)/calcium carbonate (0.165) | 0.015 | 0.20 | EVOH-60 |

TABLE 8

| | | Et mol % | DS mol % | (B1) | | (B2) | | (C) | | (B2)/(C) Molar ratio | (D) Content in terms of phosphoric acid radical ppm | (E) Content in a value of boron element ppm | Content in a value of boric acid ppm |
|---|---|---|---|---|---|---|---|---|---|---|---|---|---|
| | | | | Type | Content μmol/g | Type | Content μmol/g | Type | Content μmol/g | | | | |
| Example 34 | EVOH-45 | 32 | 99.98 | — | — | citric acid | 3.2 | Mg | 2.9 | 1.103 | 10 | 156 | 890 |
| Example 35 | EVOH-46 | 32 | 99.98 | — | — | citric acid | 7.7 | Ca | 5.3 | 1.453 | 10 | 156 | 890 |
| Example 36 | EVOH-47 | 44 | 99.98 | — | — | citric acid | 2.7 | Ca | 3.8 | 0.711 | 10 | 156 | 890 |
| Example 37 | EVOH-48 | 32 | 99.98 | — | — | citric acid | 3.8 | Mg, K, Na | 8.7 | 0.437 | 110 | 156 | 890 |
| Example 38 | EVOH-49 | 32 | 99.98 | — | — | citric acid | 5.9 | Mg, K, Na | 16.9 | 0.349 | 110 | 156 | 890 |
| Example 39 | EVOH-50 | 44 | 99.98 | — | — | citric acid | 9.0 | Mg, K, Na | 8.7 | 1.034 | 110 | 156 | 890 |
| Example 40 | EVOH-51 | 32 | 99.98 | — | — | tartaric acid | 4.6 | Ca, K, Na | 9.0 | 0.511 | 90 | 156 | 890 |
| Example 41 | EVOH-52 | 32 | 99.98 | — | — | tartaric acid | 12.5 | Ca, K, Na | 9.0 | 1.389 | 70 | 156 | 890 |
| Example 42 | EVOH-53 | 32 | 99.98 | — | — | tartaric acid | 8.6 | Ca, K, Na | 9.0 | 0.956 | 90 | 156 | 890 |
| Example 43 | EVOH-54 | 32 | 99.98 | — | — | tartaric acid | 3 | K | 7.0 | 0.429 | 10 | 156 | 890 |
| Example 44 | EVOH-55 | 32 | 99.98 | — | — | tartaric acid | 2.3 | K | 3.6 | 0.639 | 10 | 156 | 890 |
| Example 45 | EVOH-56 | 44 | 99.98 | — | — | tartaric acid | 7.5 | Na | 7.0 | 1.071 | 10 | 156 | 890 |
| Comparative Example 12 | EVOH-57 | 32 | 99.98 | acetic acid | 2.5 | — | — | Ca | 7.0 | 0.000 | 10 | 156 | 890 |
| Comparative Example 13 | EVOH-58 | 32 | 99.98 | — | — | citric acid | 0.005 | Ca | 7.0 | 0.001 | 10 | 156 | 890 |
| Comparative Example | EVOH-59 | 32 | 99.98 | — | — | citric acid | 21.9 | Mg | 7.0 | 3.129 | 10 | 156 | 890 |

TABLE 8-continued

| | | Et mol % | DS mol % | (B1) Type | (B1) Content μmol/g | (B2) Type | (B2) Content μmol/g | (C) Type | (C) Content μmol/g | (B2)/(C) Molar ratio | (D) Content in terms of phosphoric acid radical ppm | (E) Content in a value of boron element ppm | (E) Content in a value of boric acid ppm |
|---|---|---|---|---|---|---|---|---|---|---|---|---|---|
| Example 14 Comparative Example 15 | EVOH-60 | 32 | 99.98 | — | — | tartaric acid | 0.06 | Ca | 33.0 | 0.0018 | 10 | 156 | 890 |

TABLE 9

| | Coloring resistance 220° C. | Coloring resistance 260° C. | Appearance characteristic | Recyclability | Adhesiveness |
|---|---|---|---|---|---|
| Example 34 | A | A | A | A | B |
| Example 35 | A | A | A | B | B |
| Example 36 | A | A | A | A | B |
| Example 37 | A | A | A | A | A |
| Example 38 | A | B | B | A | A |
| Example 39 | A | A | A | A | A |
| Example 40 | A | A | A | A | A |
| Example 41 | A | A | A | B | A |
| Example 42 | A | A | A | A | A |
| Example 43 | A | A | A | B | A |
| Example 44 | A | B | A | C | B |
| Example 45 | A | A | A | B | A |
| Comparative Example 12 | B | D | C | B | B |
| Comparative Example 13 | B | C | C | B | B |
| Comparative Example 14 | C | B | B | D | B |
| Comparative Example 15 | D | D | C | D | B |

Example 46

Into 94.5 L of an aqueous solution prepared by dissolving each component in water so as to give 0.8 g/L acetic acid, 0.02 g/L citric acid, 0.50 g/L trisodium citrate, 0.015 g/L phosphoric acid and 0.20 g/L boric acid was placed 10.5 kg of the water-containing EVOH pellet (w-EVOH-1) obtained in Synthesis Example 1, and the mixture was subjected to immersion at 25° C. for 6 hrs with occasional stirring. The water-containing EVOH pellet after the immersion was dewatered using centrifugal dehydrator, and then dried in a hot-air dryer at 80° C. for 3 hrs, followed by drying at 120° C. for 24 hrs to obtain a pellet of a dry EVOH resin composition (EVOH-1).

When EVOH-61 was analyzed for the ethylene content and the degree of saponification according to the procedure described above, the ethylene content was 32 mol % and the degree of saponification was no less than 99.98 mol %. In addition, as a result of the analysis according to the procedure described above, the EVOH-61 contained 16.7 μmol/g of acetate ion as the monocarboxylic acid and monocarboxylate ion (B1), 0.1 μmol/g of citric acid and citrate ion as the multivalent carboxylic acid and multivalent carboxylate ion (B2), 7.4 μmol/g of sodium ion as the metal ion (C), 10 ppm of the phosphate compound (D) in a value of phosphate radical, and 156 ppm of the boron compound (E) in a value of boron element. Evaluation of the EVOH-61 for each physical property according to the procedure described above revealed the coloring characteristic decided as "A" since coloring was hardly seen at both 220° C. and 260° C., and the appearance characteristic decided as "A" since coloring was not seen on the edge of the film roll. In addition, the long-run workability was decided as "A" since even after 60 min the torque value did not reach one and a half times the torque value after 5 min, and the adhesiveness was decided as "B" since the delamination strength was 480 g/15 mm.

Examples 47 to 54 and Comparative Examples 16 to 19

The EVOH resin composition pellets (EVOH-62 to 73) were obtained in a similar manner to Example 46 except that the type of the water-containing EVOH pellet, and the type and amount of each compound blended with the aqueous solution were changed as shown in Table 10. The obtained each EVOH resin composition was analyzed and evaluated in a manner similar to Example 46. The results of the analysis of the ethylene content, etc. are shown in Table 11, and the results of the evaluation of the coloring resistance, etc. are shown in Table 12.

TABLE 10

| | | | | Type of component blended into aqueous solution and concentration | | | |
|---|---|---|---|---|---|---|---|
| | Water-containing EVOH | Et mol % | DS mol % | Carboxylic acid/metal ions Numbers in parenthesis indicating blended concentration (unit: g/L) | Phosphoric acid g/L | Boric acid g/L | |
| Example 46 | w-EVOH-1 | 32 | 99.98 | acetic acid (0.8)/citric acid (0.02)/sodium acetate (0.50) | 0.015 | 0.20 | EVOH-61 |
| Example 47 | w-EVOH-1 | 32 | 99.98 | acetic acid (0.8)/citric acid (0.65)/sodium acetate (0.50) | 0.015 | 0.20 | EVOH-62 |
| Example 48 | w-EVOH-1 | 32 | 99.98 | acetic acid (0.8)/citric acid (1.04)/sodium acetate (0.50) | 0.015 | 0.20 | EVOH-63 |
| Example 49 | w-EVOH-1 | 32 | 99.98 | acetic acid (0.8)/adipic acid (0.49)/sodium acetate (0.50) | 0.015 | 0.20 | EVOH-64 |
| Example 50 | w-EVOH-1 | 32 | 99.98 | acetic acid (0.8)/aconitic acid (0.59)/sodium acetate (0.50) | 0.015 | 0.20 | EVOH-65 |
| Example 51 | w-EVOH-1 | 32 | 99.98 | acetic acid (0.8)/aspartic acid (0.65)/sodium acetate (0.50) | 0.015 | 0.20 | EVOH-66 |
| Example 52 | w-EVOH-1 | 32 | 99.98 | acetic acid (0.8)/maleic acid (0.39)/sodium acetate (0.50) | 0.015 | 0.20 | EVOH-67 |
| Example 53 | w-EVOH-2 | 27 | 99.98 | acetic acid (0.8)/citric acid (0.65)/sodium acetate (0.50) | 0.015 | 0.21 | EVOH-68 |
| Example 54 | w-EVOH-3 | 44 | 99.98 | acetic acid (0.8)/citric acid (0.65)/sodium acetate (0.50) | 0.015 | 0.33 | EVOH-69 |
| Comparative | w-EVOH-1 | 32 | 99.98 | acetic acid (0.8)/sodium acetate (0.50) | 0.015 | 0.20 | EVOH-70 |

TABLE 10-continued

| | Water-containing EVOH | Et mol % | DS mol % | Type of component blended into aqueous solution and concentration | | | |
|---|---|---|---|---|---|---|---|
| | | | | Carboxylic acid/metal ions Numbers in parenthesis indicating blended concentration (unit: g/L) | Phosphoric acid g/L | Boric acid g/L | |
| Example 16 Comparative Example 17 | w-EVOH-1 | 32 | 99.98 | acetic acid (0.8)/citric acid (0.001)/sodium acetate (0.50) | 0.015 | 0.20 | EVOH-71 |
| Comparative Example 18 | w-EVOH-1 | 32 | 99.99 | acetic acid (0.8)/citric acid (1.95)/sodium acetate (0.50) | 0.015 | 0.20 | EVOH-72 |
| Comparative Example 19 | w-EVOH-1 | 32 | 99.98 | acetic acid (0.8)/citric acid (0.32)/sodium acetate (3.02) | 0.015 | 0.20 | EVOH-73 |

TABLE 11

| | | Et mol % | DS mol % | (B1) | | (B2) | | (C) | | (B2)/(C) | (D) Content in a value of phosphate radical ppm | (E) Content in a value of boron element ppm | Content in a value of boric acid ppm |
|---|---|---|---|---|---|---|---|---|---|---|---|---|---|
| | | | | Type | Content μmol/g | Type | Content μmol/g | Type | Content μmol/g | Molar ratio | | | |
| Example 46 | EVOH-61 | 32 | 99.98 | acetic acid | 16.7 | citric acid | 0.08 | Na | 7.39 | 0.0108 | 10 | 156 | 890 |
| Example 47 | EVOH-62 | 32 | 99.98 | acetic acid | 16.7 | citric acid | 2.60 | Na | 7.39 | 0.3518 | 10 | 156 | 890 |
| Example 48 | EVOH-63 | 32 | 99.98 | acetic acid | 16.7 | citric acid | 4.16 | Na | 7.39 | 0.5629 | 10 | 156 | 890 |
| Example 49 | EVOH-64 | 32 | 99.98 | acetic acid | 16.7 | adipic acid | 2.60 | Na | 7.39 | 0.3518 | 10 | 156 | 890 |
| Example 50 | EVOH-65 | 32 | 99.98 | acetic acid | 16.7 | Aconitic acid | 2.60 | Na | 7.39 | 0.3518 | 10 | 156 | 890 |
| Example 51 | EVOH-66 | 32 | 99.98 | acetic acid | 16.7 | aspartic acid | 2.60 | Na | 7.39 | 0.3518 | 10 | 156 | 890 |
| Example 52 | EVOH-67 | 32 | 99.98 | acetic acid | 16.7 | maleic acid | 2.60 | Na | 7.39 | 0.3518 | 10 | 156 | 890 |
| Example 53 | EVOH-68 | 27 | 99.98 | acetic acid | 16.7 | citric acid | 2.60 | Na | 7.39 | 0.3518 | 10 | 96 | 550 |
| Example 54 | EVOH-69 | 44 | 99.98 | acetic acid | 16.7 | citric acid | 2.60 | Na | 7.39 | 0.3518 | 10 | 227 | 1300 |
| Comparative Example 16 | EVOH-70 | 32 | 99.98 | acetic acid | 16.7 | — | — | Na | 7.39 | — | 10 | 156 | 890 |
| Comparative Example 17 | EVOH-71 | 32 | 99.98 | acetic acid | 16.7 | citric acid | 0.01 | Na | 7.39 | 0.0014 | 10 | 156 | 890 |
| Comparative Example 18 | EVOH-72 | 32 | 99.99 | acetic acid | 16.7 | citric acid | 7.81 | Na | 3.48 | 2.2443 | 10 | 156 | 890 |
| Comparative Example 19 | EVOH-73 | 32 | 99.98 | acetic acid | 16.7 | citric acid | 0.08 | Na | 43.48 | 0.0018 | 10 | 156 | 890 |

TABLE 12

| | Coloring resistance | | Appearance characteristic | Long-run workability | Adhesiveness |
|---|---|---|---|---|---|
| | 220° C. | 260° C. | | | |
| Example 46 | A | B | A | A | B |
| Example 47 | A | A | A | A | A |
| Example 48 | A | A | A | A | A |
| Example 49 | B | B | B | A | B |
| Example 50 | B | B | B | A | B |
| Example 51 | B | B | B | A | B |
| Example 52 | B | B | B | A | B |
| Example 53 | A | A | A | A | A |
| Example 54 | A | A | A | A | A |
| Comparative Example 16 | B | C | C | A | B |
| Comparative Example 17 | B | C | C | A | A |
| Comparative Example 18 | B | B | A | C | C |
| Comparative Example 19 | C | C | C | B | A |

Example 55

A water-containing EVOH pellet (w-EVOH-7) was obtained similarly to Synthesis Example 1 except that 22 g of citric acid was further added in neutralizing and stopping the reaction by adding acetic acid and water in the saponifying step in the Synthesis Example 1 and thereafter washing, pelletizing and purification were carried out according to an operation similar to Example 1. Furthermore, a pellet of a dry EVOH resin composition (EVOH-74) was obtained according to an operation similar to Example 1 except that w-EVOH-7 was used in place of w-EVOH-1.

Example 56

A water-containing EVOH pellet (w-EVOH-8) was obtained similarly to Synthesis Example 1 except that 2 g of citric acid was added when the EVOH was dissolved in the water/methanol mixed solution in the pelletizing step in the Synthesis Example 1 and thereafter purification was carried out according to an operation similar to Example 1. Furthermore, a pellet of a dry EVOH resin composition (EVOH-75) was obtained according to an operation similar to Example 1 except that w-EVOH-8 was used in place of w-EVOH-1.

Example 57

The w-EVOH-1 obtained in Synthesis Example 1 was dried in a hot-air dryer at 80° C. for 1 hour, whereby a water-containing EVOH pellet having a moisture content of 50% by mass was obtained. The obtained water-containing EVOH pellet was charged into a biaxial extruder (details shown below) at a rate of 10 kg/hr, then the temperature of the resin in a discharge opening was adjusted to 100° C., and an aqueous solution including 0.63 g/L citric acid, 6.74 g/L trisodium citrate, 0.11 g/L phosphoric acid and 9.9 g/L boric acid was added at a rate of 0.6 L/hr from a solution adding part at a tip part on the discharge opening side shown in FIG. 1. The strand-shaped and melted water-containing EVOH discharged from a dice was cut by a strand cutter to obtain a cylindrical water-containing EVOH pellet (moisture content: 25% by mass). The obtained water-containing EVOH pellet was dried in a hot-air dryer at 80° C. for 1 hour, followed by consequently drying at 120° C. for 24 hrs to obtain a pellet of dry EVOH resin composition (EVOH-76).

<Detailed Specifications of Biaxial Extruder>
Screw Diameter: 30 mm
L/D: 45.5
Screw: fully intermeshing type in the same direction (detailed configuration of screw being shown in FIG. 1)
Screw rotation speed: 300 rpm
Die: 3 mmϕ, 5-holes strand die
Winding speed: 5 m/min

Example 58

A water-containing EVOH pellet (w-EVOH-9) was obtained by carrying out saponification, washing, pelletizing and purification according to an operation similar to Synthesis Example 1 except that 101 g of vinyl acetate (400 ppm with respect to the methanol solution having a concentration of 15% of EVAc) and 27 g of trisodium citrate were added to the methanol solution having a concentration of 15% by mass of EVAc used for the saponifying step, and that an alkali solution was added after the mixture was stirred to permit homogenous dissolution in Synthesis Example 1. Furthermore, a pellet of a dry EVOH resin composition (EVOH-77) was obtained according to an operation similar to Example 1 except that w-EVOH-9 was used in place of w-EVOH-1.

Example 59

A water-containing EVOH pellet (w-EVOH-10) was obtained by carrying out saponification, washing, pelletizing and purification according to an operation similar to Example 57 except that the amount of vinyl acetate added was changed to 152 g (600 ppm with respect to the methanol solution having a concentration of 15% of EVAc) in Example 58. Furthermore, a pellet of the dry EVOH resin composition (EVOH-78) was obtained according to an operation similar to Example 1 except that w-EVOH-10 was used in place of w-EVOH-1.

Comparative Example 20

A water-containing EVOH pellet (w-EVOH-11) was obtained by carrying out polymerization, saponification, washing, pelletizing and purification according to an operation similar to Synthesis Example 1 except that 48 g of citric acid was further added when vinyl acetate and methanol were charged into the reaction tank in the polymerization step in Synthesis Example 1. Furthermore, a pellet of a dry EVOH resin composition (EVOH-79) was obtained according to an operation similar to Comparative Example 1 except that w-EVOH-11 was used in place of w-EVOH-1.

The dry EVOH resin composition pellets EVOH-74 to −79 obtained in Examples 55 to 59 and Comparative Example 20 were analyzed and evaluated in a manner similar to Example 1. The results of the analysis of the ethylene content, etc. and the evaluation of coloring resistance, etc. are shown in Table 13 and Table 14.

TABLE 13

| | | Et mol % | DS mol % | (B1) Type | (B1) Content μmol/g | (B2) Type | (B2) Content μmol/g | (C) Type | (C) Content μmol/g | (B2)/(C) Molar ratio | (D) Content in a value of phosphate radical ppm | (E) Content in a value of boron element ppm | Content in a value of boric acid ppm |
|---|---|---|---|---|---|---|---|---|---|---|---|---|---|
| Example 55 | EVOH-74 | 32 | 99.98 | — | — | citric acid | 2.6 | Na | 7.0 | 0.371 | 10 | 156 | 890 |
| Example 56 | EVOH-75 | 32 | 99.98 | — | — | citric acid | 2.6 | Na | 7.0 | 0.371 | 10 | 156 | 890 |
| Example 57 | EVOH-76 | 32 | 99.98 | — | — | citric acid | 2.6 | Na | 7.0 | 0.371 | 10 | 156 | 890 |
| Example 58 | EVOH-77 | 32 | 99.98 | — | — | citric acid | 2.6 | Na | 7.0 | 0.371 | 10 | 156 | 890 |
| Example 59 | EVOH-78 | 32 | 99.98 | — | — | citric acid | 2.6 | Na | 7.0 | 0.371 | 10 | 156 | 890 |
| Comparative Example 20 | EVOH-79 | 32 | 99.98 | acetic acid | 2.5 | citric acid | <0.01 | Na | 7.0 | <0.001 | 10 | 156 | 890 |

TABLE 14

| | Coloring resistance 220° C. | Coloring resistance 260° C. | Appearance characteristic | Long-run workability | Adhesiveness |
|---|---|---|---|---|---|
| Example 55 | A | A | A | A | A |
| Example 56 | A | A | A | A | A |
| Example 57 | A | A | A | A | A |
| Example 58 | A | A | A | A | A |
| Example 59 | B | B | B | A | A |
| Comparative Example 20 | C | D | C | A | A |

INDUSTRIAL APPLICABILITY

The EVOH resin composition of the present invention can be suitably used as a material for various types of molded articles such as monolayered or multilayered films, sheets, pipes, containers and fibers superior in the appearance characteristics since the EVOH resin composition of the present invention is superior in appearance characteristics and long-run workability, and enables occurrence of coloring such as yellowing to be inhibited even by melt molding at high temperatures, particularly, for example, a high temperature of no less than 260° C.

EXPLANATION OF THE REFERENCE SYMBOLS 1 material supply part
2, 4, 6 full flighted screw part
3, 5 reverse flighted screw part
7 vent cylinder part
8 minor component adding part
9 temperature sensor
10 cylinder barrel
11 discharge opening
20 biaxial extruder

The invention claimed is:

1. A resin composition, comprising:
   (A) an ethylene-vinyl alcohol copolymer;
   (B) a carboxylic acid, a carboxylate ion, or a mixture thereof; and
   (C) a metal ion,
   wherein
   the component (B) comprises (B2) a multivalent carboxylic acid, a multivalent carboxylate ion, or a mixture thereof,
   the metal ion (C) comprises (C1) an alkali metal ion, (C2) an alkaline earth metal ion, or a combination thereof,
   a content of the component (B2) ranges from 0.01 µmol/g to 20 µmol/g,
   a content of the component (C) ranges from 2.5 µmol/g to 22 µmol/g, and
   a molar ratio of the multivalent carboxylic acid and the multivalent carboxylate ion (B2) to the metal ion (C), (B2/C), ranges from 0.002 to 2.

2. The resin composition of claim 1, wherein at least a pair of carboxyl groups in the component (B2) are linked to each other via a linking group comprising 1 or 2 carbon atom(s).

3. The resin composition of claim 1, wherein the component (B2) comprises at least three carboxyl groups.

4. The resin composition of claim 1, wherein the component (C) comprises (C2) an alkaline earth metal ion.

5. The resin composition of claim 1, further comprising:
   (D) a phosphate compound,
   wherein a content of the phosphate compound (D) in the resin composition ranges from 5 ppm to 500 ppm in a value of phosphate radical.

6. The resin composition of claim 1, further comprising:
   (E) a boron compound,
   wherein a content of the boron compound (E) in the resin composition ranges from 5 ppm to 2,000 ppm in a value of boron element.

7. The resin composition of claim 1, wherein a content of (B1) a monocarboxylic acid and a monocarboxylate ion as the component (B) in the resin composition is less than 2 µmol/g.

8. The resin composition of claim 1, wherein
   the component (B) further comprises (B1) a monocarboxylic acid, a monocarboxylate ion, or a mixture thereof, and
   a content of the monocarboxylic acid and the monocarboxylate ion (B1) in the resin composition is no less than 2 µmol/g.

9. The resin composition of claim 1, being adapted for use in co-extrusion molding.

10. The resin composition of claim 1, wherein the component (B2) comprises at least one functional group selected from the group consisting of a hydroxy group, an amino group, and a ketone group.

11. The resin composition of claim 10, wherein the component (B2) comprises a hydroxy group.

12. The resin composition of claim 1, wherein the component (C) comprises (C1) an alkali metal ion.

13. The resin composition of claim 12, wherein a content of the component (C1) in the resin ranges from 2.5 µmol/g to 22 µmol/g.

14. The resin composition of claim 12, wherein a molar ratio of the component (B2) to the component (C1), (B2/C1), ranges from 0.002 to 2.

15. A method for producing the resin composition of claim 1, the method comprising:
   (I) copolymerizing ethylene and a vinyl ester, to obtain an ethylene-vinyl ester copolymer;
   (II) saponifying the ethylene-vinyl ester copolymer, to obtain an ethylene-vinyl alcohol copolymer; and
   (III) later than (I), mixing the ethylene-vinyl ester copolymer or the ethylene vinyl alcohol copolymer with (B2') a multivalent carboxylic acid, a salt of a multivalent carboxylic acid, or a mixture thereof.

16. The method of claim 15, wherein the mixing is carried out in a system in which the concentration of the vinyl ester is no greater than 1,000 ppm.

17. The method of claim 15, wherein the mixing step is carried out in the saponifying.

18. The method of claim 15, further comprising:
   (IV) pelletizing a solution comprising the ethylene-vinyl alcohol copolymer obtained in (II), to obtain a water-comprising pellet comprising the ethylene-vinyl alcohol copolymer; and
   (V) drying the water-comprising pellet, to obtain a resin composition comprising an ethylene-vinyl alcohol copolymer,
   wherein the mixing is carried out after the pelletizing.

19. The method of claim 18, wherein the mixing is carried out between the pelletizing and the drying by immersing the water-comprising pellet in a solution containing the component (B2').

20. The method of claim 18, wherein the mixing is carried out in the pelletizing.

21. A multilayered structure, comprising a layer comprising the resin composition of claim 1.

* * * * *